(12) United States Patent
Choi et al.

(10) Patent No.: US 12,393,225 B2
(45) Date of Patent: Aug. 19, 2025

(54) ELECTRONIC DEVICE, METHOD, AND NON-TRANSITORY COMPUTER-READABLE STORAGE MEDIUM FOR DISPLAYING VISUAL OBJECT FOR CHANGING SIZE OF DISPLAY REGION OF FLEXIBLE DISPLAY

(71) Applicant: Samsung Electronics Co., Ltd., Suwon-si (KR)

(72) Inventors: Yunsung Choi, Suwon-si (KR); Eunsil Lim, Suwon-si (KR); Jeongwon Ko, Suwon-si (KR); Woohyun Kim, Suwon-si (KR); Bona Lee, Suwon-si (KR); Yusin Jung, Suwon-si (KR); Yeonjoo Jwa, Suwon-si (KR); Joonsung Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 18/146,722

(22) Filed: Dec. 27, 2022

(65) Prior Publication Data
US 2023/0333592 A1   Oct. 19, 2023

Related U.S. Application Data

(63) Continuation of application No. PCT/KR2022/020389, filed on Dec. 14, 2022.

(30) Foreign Application Priority Data

Apr. 14, 2022   (KR) ........................ 10-2022-0046572
Jul. 13, 2022   (KR) ........................ 10-2022-0086597

(51) Int. Cl.
*G06F 1/16*      (2006.01)
*G06F 3/0481*   (2022.01)
(Continued)

(52) U.S. Cl.
CPC .......... *G06F 1/1624* (2013.01); *G06F 1/1652* (2013.01); *G06F 3/0481* (2013.01); *G06F 3/0484* (2013.01); *G06F 9/451* (2018.02)

(58) Field of Classification Search
None
See application file for complete search history.

(56) References Cited

U.S. PATENT DOCUMENTS 9,953,617 B2    4/2018   Eim et al.
10,216,398 B2   2/2019   Woo et al.
(Continued)

FOREIGN PATENT DOCUMENTS

EP    3 958 105 A1    2/2022
EP    4 027 626 A1    7/2022
(Continued)

OTHER PUBLICATIONS

International Search Report dated Mar. 23, 2023, issued in International Application No. PCT/KR2022/020389.
(Continued)

*Primary Examiner* — Md Saiful A Siddiqui
(74) *Attorney, Agent, or Firm* — Jefferson IP Law, LLP

(57) ABSTRACT

An electronic device is provided. The electronic device includes a housing, a flexible display configured to slide into or out of the housing, an actuator configured to pull in at least a portion of the flexible display into the housing or pull out at least a portion of the flexible display from the housing, a memory, and a processor. The processor is configured to display a visual object for guiding to change a state of a display region to a reference state, based on identifying that the state of the display region is distinguished from the reference state.

20 Claims, 28 Drawing Sheets

(51) Int. Cl.
*G06F 3/0484* (2022.01)
*G06F 9/451* (2018.01)

(56) References Cited

U.S. PATENT DOCUMENTS

| | | | |
|---|---|---|---|
| 10,452,156 B2 | 10/2019 | Kang et al. | |
| 10,963,016 B1* | 3/2021 | Oh | G06F 3/0416 |
| 11,106,245 B2 | 8/2021 | Shim et al. | |
| 11,244,658 B1* | 2/2022 | Hong | G09G 3/035 |
| 11,366,563 B2* | 6/2022 | Kim | G06F 1/1681 |
| 12,032,865 B2 | 7/2024 | Matsumura et al. | |
| 2013/0275910 A1* | 10/2013 | Kim | G06F 1/1652 |
| | | | 715/800 |
| 2016/0349971 A1* | 12/2016 | Chi | G09G 5/373 |
| 2016/0378270 A1 | 12/2016 | Lee et al. | |
| 2017/0061932 A1* | 3/2017 | Kwon | G06F 1/1626 |
| 2017/0220307 A1* | 8/2017 | Da Silva Ramos | G06F 3/1438 |
| 2020/0249820 A1* | 8/2020 | Choi | G06F 3/04886 |
| 2021/0157366 A1* | 5/2021 | Shim | G06F 1/1652 |
| 2021/0337049 A1 | 10/2021 | Noh et al. | |
| 2021/0385311 A1* | 12/2021 | Kim | G06F 1/1677 |
| 2022/0035513 A1* | 2/2022 | Kang | G06F 3/0481 |
| 2022/0148464 A1* | 5/2022 | Kwak | G09F 9/301 |
| 2022/0329687 A1* | 10/2022 | Kim | H04M 1/72469 |
| 2022/0385750 A1 | 12/2022 | Kim et al. | |
| 2023/0029563 A1 | 2/2023 | Choi et al. | |
| 2023/0214103 A1* | 7/2023 | Kim | G06F 1/1652 |
| | | | 715/788 |
| 2023/0325061 A1* | 10/2023 | Gao | G06F 1/1624 |
| | | | 715/764 |

FOREIGN PATENT DOCUMENTS

| | | |
|---|---|---|
| KR | 10-2016-0123620 A | 10/2016 |
| KR | 10-2017-0005557 A | 1/2017 |
| KR | 10-2017-0038308 A | 4/2017 |
| KR | 10-2017-0062121 A | 6/2017 |
| KR | 10-2021-0154723 A | 12/2021 |
| KR | 10-2022-0008742 A | 1/2022 |
| KR | 10-2022-0014751 A | 2/2022 |
| WO | 2021/045276 A1 | 3/2021 |
| WO | 2021/085658 A1 | 5/2021 |
| WO | 2021/095925 A1 | 5/2021 |
| WO | 2021/100932 A1 | 5/2021 |
| WO | 2022/049795 A1 | 3/2022 |

OTHER PUBLICATIONS

Extended European Search Report dated Mar. 14, 2025; European Appln. No. 22937581.1-1218/4429218 PCT/KR2022020389.

* cited by examiner

ELECTRONIC DEVICE, METHOD, AND NON-TRANSITORY COMPUTER-READABLE STORAGE MEDIUM FOR DISPLAYING VISUAL OBJECT FOR CHANGING SIZE OF DISPLAY REGION OF FLEXIBLE DISPLAY

CROSS-REFERENCE TO RELATED APPLICATION(S)

This application is a continuation application, claiming priority under § 365(c), of an International application No. PCT/KR2022/020389, filed on Dec. 14, 2022, which is based on and claims the benefit of a Korean patent application number 10-2022-0046572, filed on Apr. 14, 2022, in the Korean Intellectual Property Office, and of a Korean patent application number 10-2022-0086597, filed on Jul. 13, 2022, in the Korean Intellectual Property Office, the disclosure of each of which is incorporated by reference herein in its entirety.

TECHNICAL FIELD

The disclosure relates to an electronic device, a method, and a non-transitory computer-readable storage medium for displaying a visual object for changing a size of a display region of a flexible display.

BACKGROUND ART

An electronic device including a flexible display such as e.g., a rollable display may provide a state in which a part of the flexible display is slid into a housing of the electronic device and a state in which the part of the flexible display is exposed outside the housing. The electronic device can provide a relatively wide display region while having a relatively compact structure by means of providing those states.

The above information is presented as background information only to assist with an understanding of the disclosure. No determination has been made, and no assertion is made, as to whether any of the above might be applicable as prior art with regard to the disclosure.

DISCLOSURE

Technical Solution

In accordance with an aspect of the disclosure, an electronic device is provided. The electronic device includes a housing, a flexible display configured to slide into or out of the housing, an actuator configured to pull in at least a portion of the flexible display into the housing or pull out at least a portion of the flexible display from the housing, a memory configured to store instructions, and a processor operatively coupled to the flexible display. The processor may be configured to receive a user input for changing an execution state of a software application when the instructions are executed, when the instructions are executed, identify whether a state of a display region of the flexible display exposed out of the housing is a reference state, in response to the user input, when the instructions are executed, display a visual object for guiding to change the state of the display region to the reference state, based on identifying that the state of the display region is distinguished from the reference state, when the instructions are executed, control the actuator to change a size of the display region from a first size to a second size corresponding to the reference state, based at least in part on the user input received while the visual object is displayed, and when the instructions are executed, display a user interface of the software application in the display region having the second size.

In accordance with another aspect of the disclosure, a method for operating an electronic device including a housing, a flexible display that is slidable into or slidable out of the housing, and an actuator for pulling in at least a portion of the flexible display into the housing or pulling out at least a portion of the flexible display from the housing is provided. The method includes receiving a user input for changing an execution state of a software application. The method includes identifying whether a state of a display region of the flexible display exposed out of the housing is a reference state, in response to the user input. The method includes displaying a visual object for guiding to change the state of the display region to the reference state, based on identifying that the state of the display region is distinguished from the reference state. The method includes changing a size of the display region from a first size to a second size corresponding to the reference state through the actuator, based at least in part on the user input received while the visual object is displayed. The method includes displaying a user interface of the software application in the display region having the second size.

In accordance with another aspect of the disclosure, a non-transitory computer-readable storage medium is provided. The non-transitory computer-readable storage medium stores at least one program including instructions that, when executed by a processor of an electronic device including a housing, a flexible display that is slidable into or slidable out of the housing, and an actuator for pulling in at least a portion of the flexible display into the housing or pulling out at least a portion of the flexible display from the housing, cause the electronic device to receive a user input for changing an execution state of a software application when the instructions are executed. The at least one program includes instructions that causes, when executed by the processor of the electronic device, the electronic device to identify whether a state of a display region of the flexible display exposed out of the housing is a reference state, in response to the user input. The at least one program includes instructions that causes, when executed by the processor of the electronic device, the electronic device to display a visual object for guiding to change the state of the display region to the reference state, based on identifying that the state of the display region is distinguished from the reference state. The at least one program includes instructions that causes, when executed by the processor of the electronic device, the electronic device to change a size of the display region from a first size to a second size corresponding to the reference state through the actuator, based at least in part on the user input received while the visual object is displayed. The at least one program includes instructions that causes, when executed by the processor of the electronic device, the electronic device to display a user interface of the software application in the display region having the second size.

In accordance with another aspect of the disclosure, an electronic device is provided. The electronic device includes a housing, a flexible display that is slidable into or slidable out of the housing, an actuator for pulling in at least a portion of the flexible display into the housing or pulling out at least a portion of the flexible display from the housing, a memory configured to store instructions, and a processor operatively coupled to the flexible display. The processor may be configured to identify, when the instructions are executed, that, while a user interface of a software application is displayed, a content in the user interface is intersected with an edge of a display region of the flexible display exposed out of the housing. The processor may be configured to, when the instructions are executed, display a visual object for guiding to change a state of the display region around the content, based on the identifying. The processor may be configured to, when the instructions are executed, extend the display region through the actuator to resume displaying of a portion of the content that was interrupted according to the intersection with the edge, in response to a user input on the visual object.

In accordance with another aspect of the disclosure, a method for operating an electronic device including a housing, a flexible display that is slidable into or slidable out of the housing, and an actuator for pulling in at least a portion of the flexible display into the housing or pulling-out at least a portion of the flexible display from the housing is provided. The method includes identifying that, while a user interface of a software application is displayed, a content in the user interface is intersected with an edge of a display region of the flexible display exposed out of the housing. The method includes displaying a visual object for guiding to change a state of the display region around the content, based on the identifying. The method includes extending the display region through the actuator to resume displaying of a portion of the content that was interrupted upon the intersection with the edge, in response to a user input on the visual object.

In accordance with another aspect of the disclosure, a non-transitory computer-readable storage medium is provided. The non-transitory computer-readable storage medium stores at least one program including instructions that, when executed by a processor of an electronic device including a housing, a flexible display that is slidable into or slidable out of the housing, and an actuator for pulling-in at least a portion of the flexible display into the housing or pulling-out at least a portion of the flexible display from the housing, cause the electronic device to identify that, while a user interface of a software application is displayed, a content in the user interface is intersected with an edge of a display region of the flexible display exposed out of the housing. The at least one program includes instructions that, when executed by the processor of the electronic device, cause the electronic device to display a visual object for guiding to change a state of the display region around the content, based on the identifying. The at least one program includes instructions that, when executed by the processor of the electronic device, cause the electronic device to extend the display region through the actuator to resume displaying of a portion of the content that was interrupted upon the intersection with the edge, in response to a user input on the visual object.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

An electronic device may comprise a flexible display that is at least partially slidable into a housing of the electronic device or at least partially slidable out of the housing. A size of a display region of the flexible display exposed outside the housing may be changed according to the sliding-in or sliding-out operation. For example, the size of the display region may be changed from a first size to a second size different from the first size according to the sliding-in or sliding-out operation. For example, a user experience provided through the display region having the first size may be different from a user experience provided through the display region having the second size. Accordingly, there are demands for a solution for adaptively changing the size of the display region according to circumstances.

Figure 1:
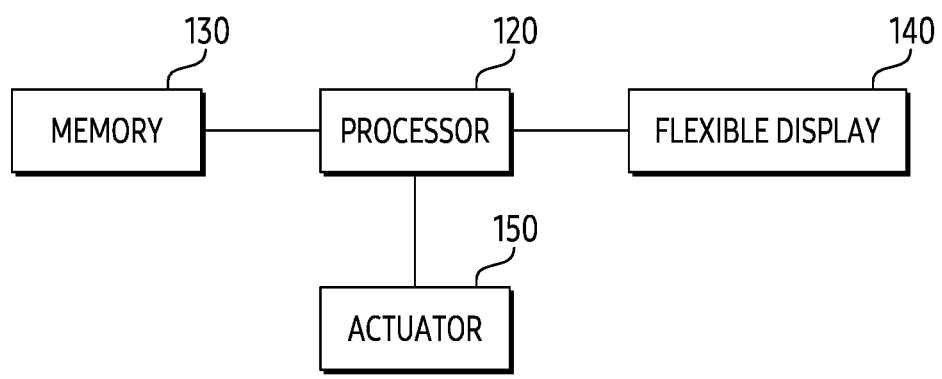
FIG. 1 illustrates elements of an electronic device according to an embodiment of the disclosure.

FIG. 1 illustrates elements of an electronic device according to an embodiment of the disclosure.

Figure 20:
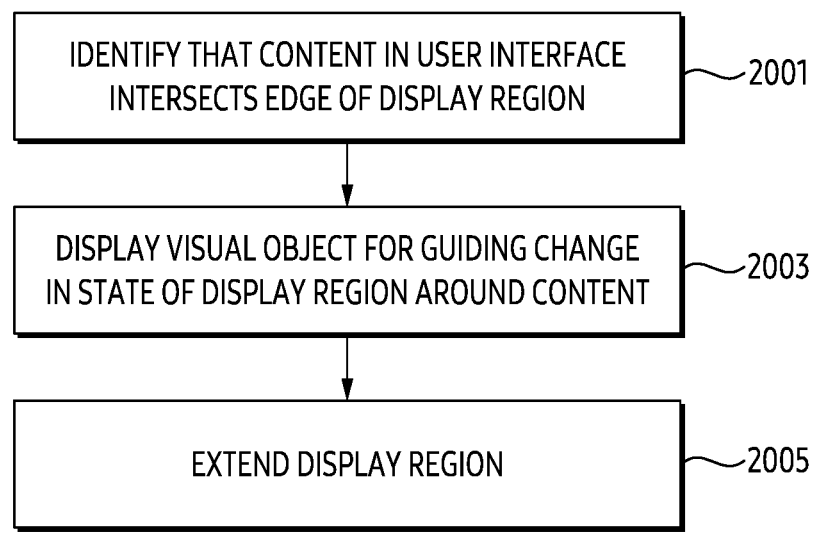
FIG. 20 illustrates an example method of displaying a visual object based on identification of a content intersected with a periphery of a display region according to an embodiment of the disclosure.
Figure 22A:
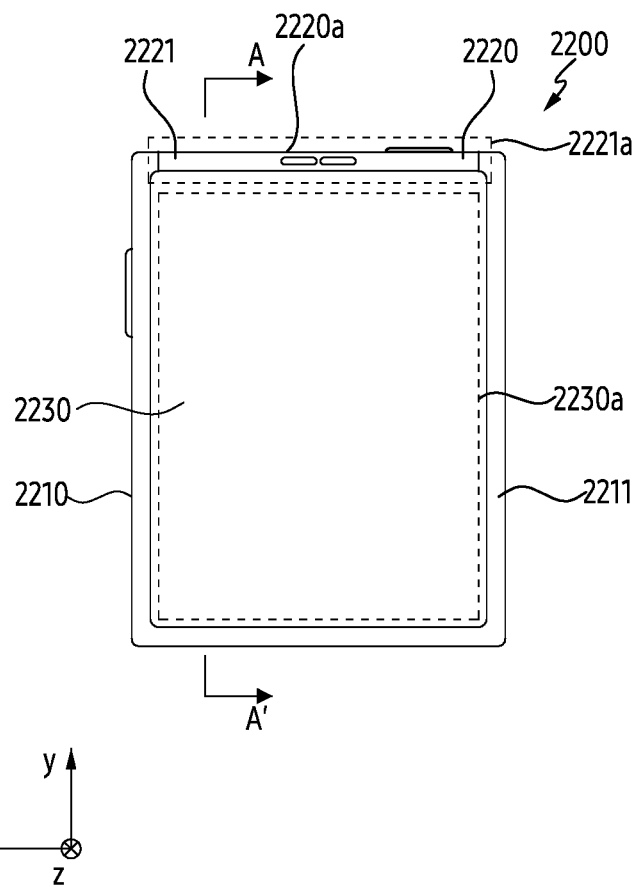
FIG. 22A is a front view illustrating a first state of an electronic device according to an embodiment of the disclosure.
Figure 22B:
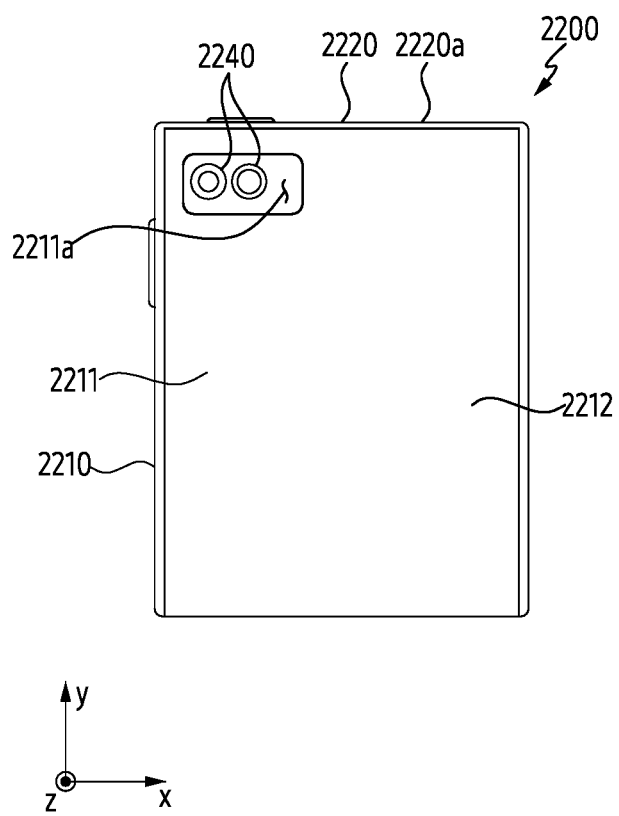
FIG. 22B is a rear view illustrating a first state of an electronic device according to an embodiment of the disclosure.
Figure 22C:
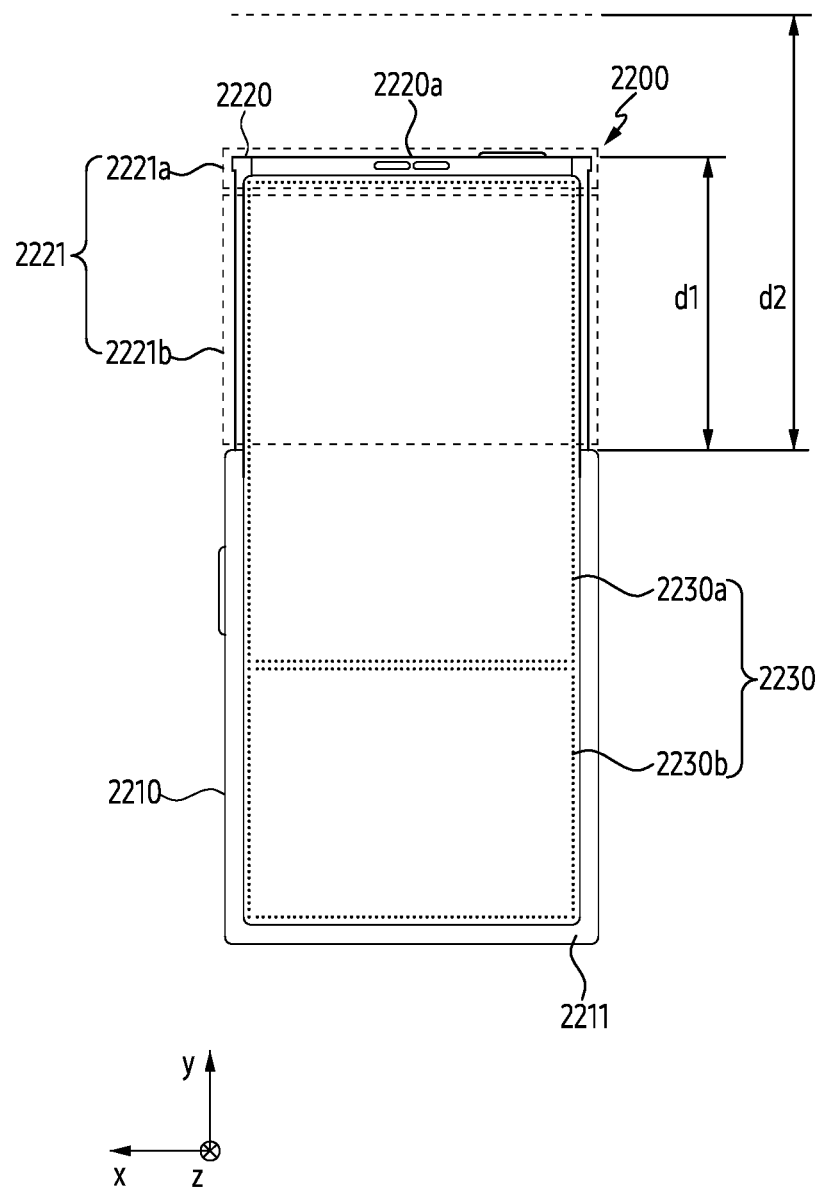
FIG. 22C is a front view illustrating a second state of an electronic device according to an embodiment of the disclosure.
Figure 22D:
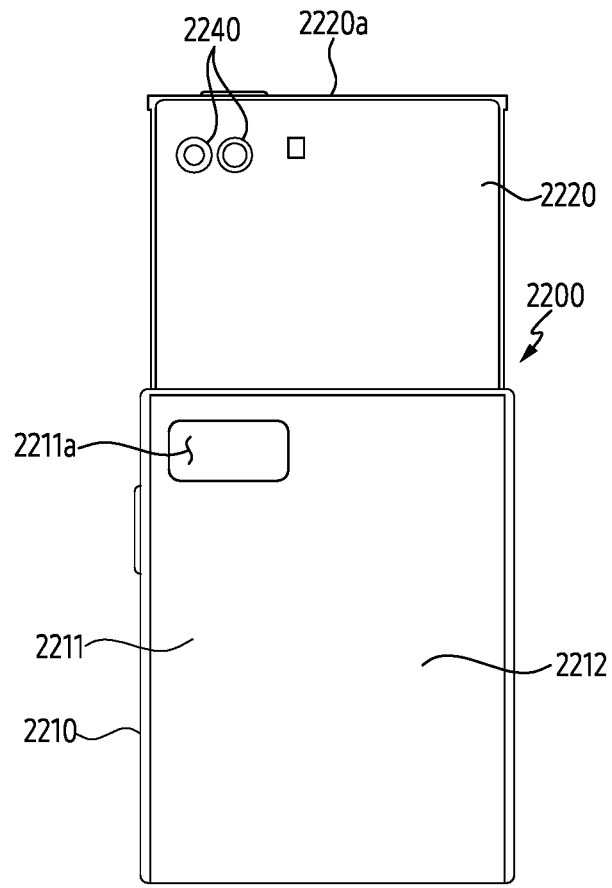
FIG. 22D is a rear view illustrating a second state of an electronic device according to an embodiment of the disclosure.
Figure 23A:
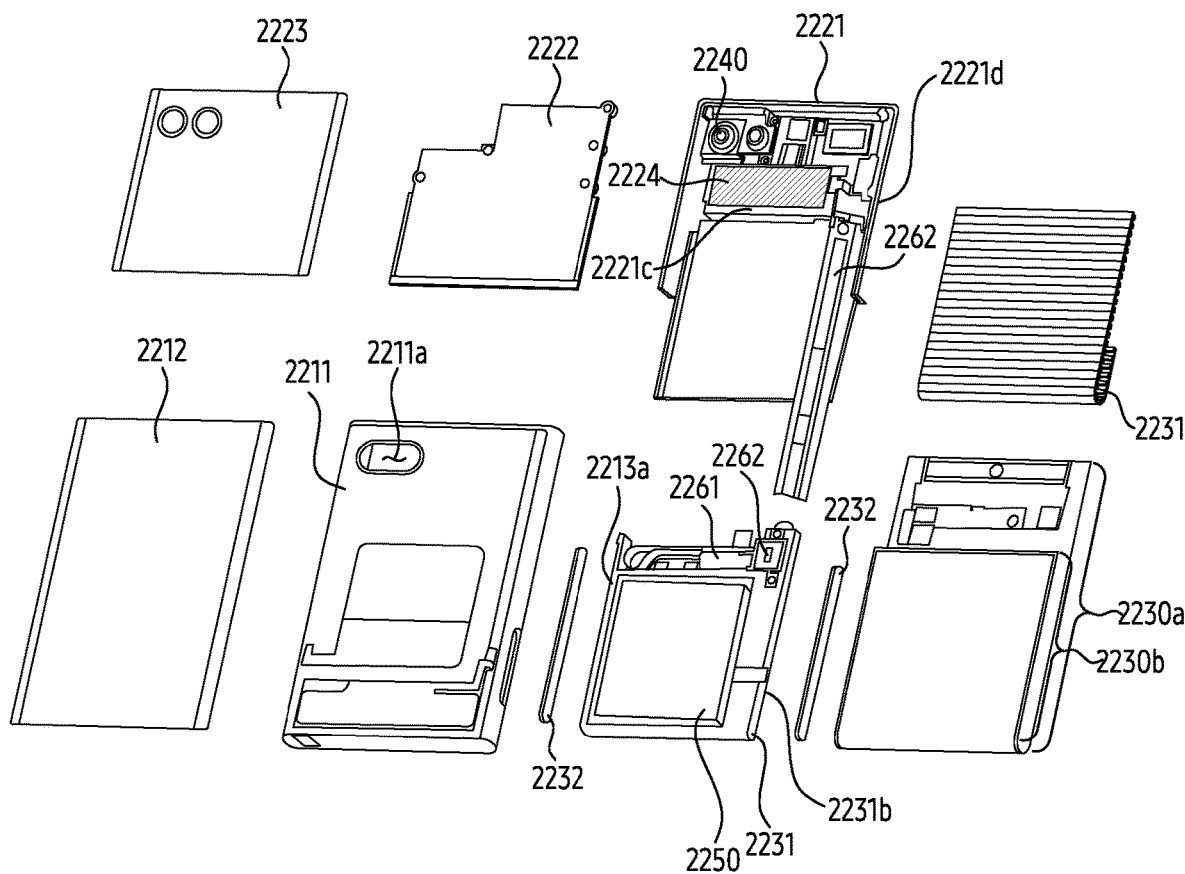
FIG. 23A is an exploded perspective view of an electronic device according to an embodiment of the disclosure.
Figure 23A:
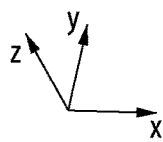
Figure 23B:
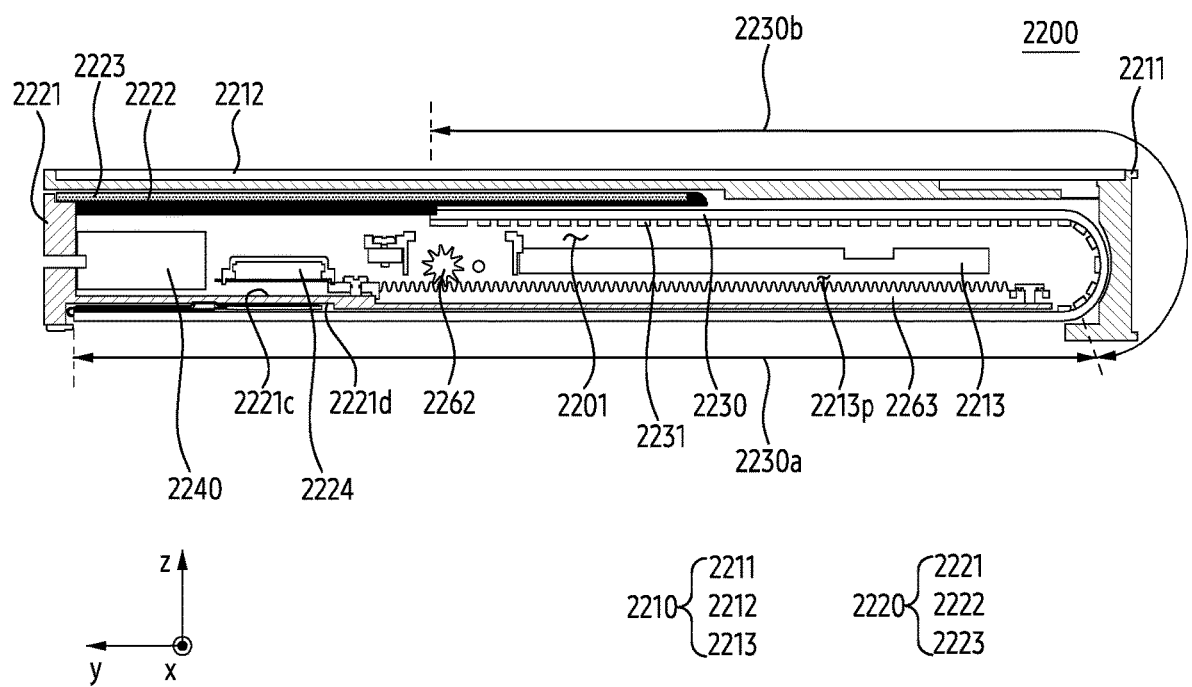
FIG. 23B is a cross-sectional view illustrating an example of the electronic device according to an embodiment taken along a line A-A' of FIG. 22A according to an embodiment of the disclosure.

Referring to FIG. 1, an electronic device 101 may be implemented with an electronic device 2001 illustrated in FIG. 20, an electronic device 2200 illustrated in FIGS. 22A to 22D, and an electronic device 2200 illustrated in FIGS. 23A and 23B.

The electronic device 101 may include a processor 120, a memory 130, a flexible display 140, and an actuator 150. The processor 120 may be operatively coupled with the memory 130, the flexible display 140, and the actuator 150.

The memory 130 may store one or more programs (or one or more software applications) including instructions. The instructions may be included to execute at least some of the operations illustrated through the descriptions of FIGS. 3, 4, 5, 6, 7, 8A, 8B, 9, 10, 11, 12, 13, 14, 15, 16, 17, 18, 19, 20, and 21.

The flexible display 140 may change a display state of a display region of the flexible display 140 based on the control of the processor 120.

The actuator 150 may include a driving unit 2260 illustrated in FIGS. 23A and 23B. The actuator 150 may configured to pull-in at least a portion of the flexible display 140 into the housing of the electronic device 101 or pull-out at least a portion of the flexible display 140 from the housing, based on the control of the processor 120.

The flexible display 140 may be at least partially pulled-in into the housing of the electronic device 101 by means of the actuator 150. The flexible display 140 may be a display that can be at least partially rolled up into the housing. The flexible display 140 may be at least partially pulled-out from the housing through by means of the actuator 150. The flexible display 140 may be at least partially exposed outside the housing. The flexible display 140 may include a display region at least partially exposed out of the housing. The flexible display 140 may provide a plurality of states according to the pull-in into the housing or the pull-out from the housing. A size of the display region may be different from each other in each of the plurality of states. An example of the plurality of states provided by the flexible display 140 is provided below with reference to FIG. 2.

Figure 2:
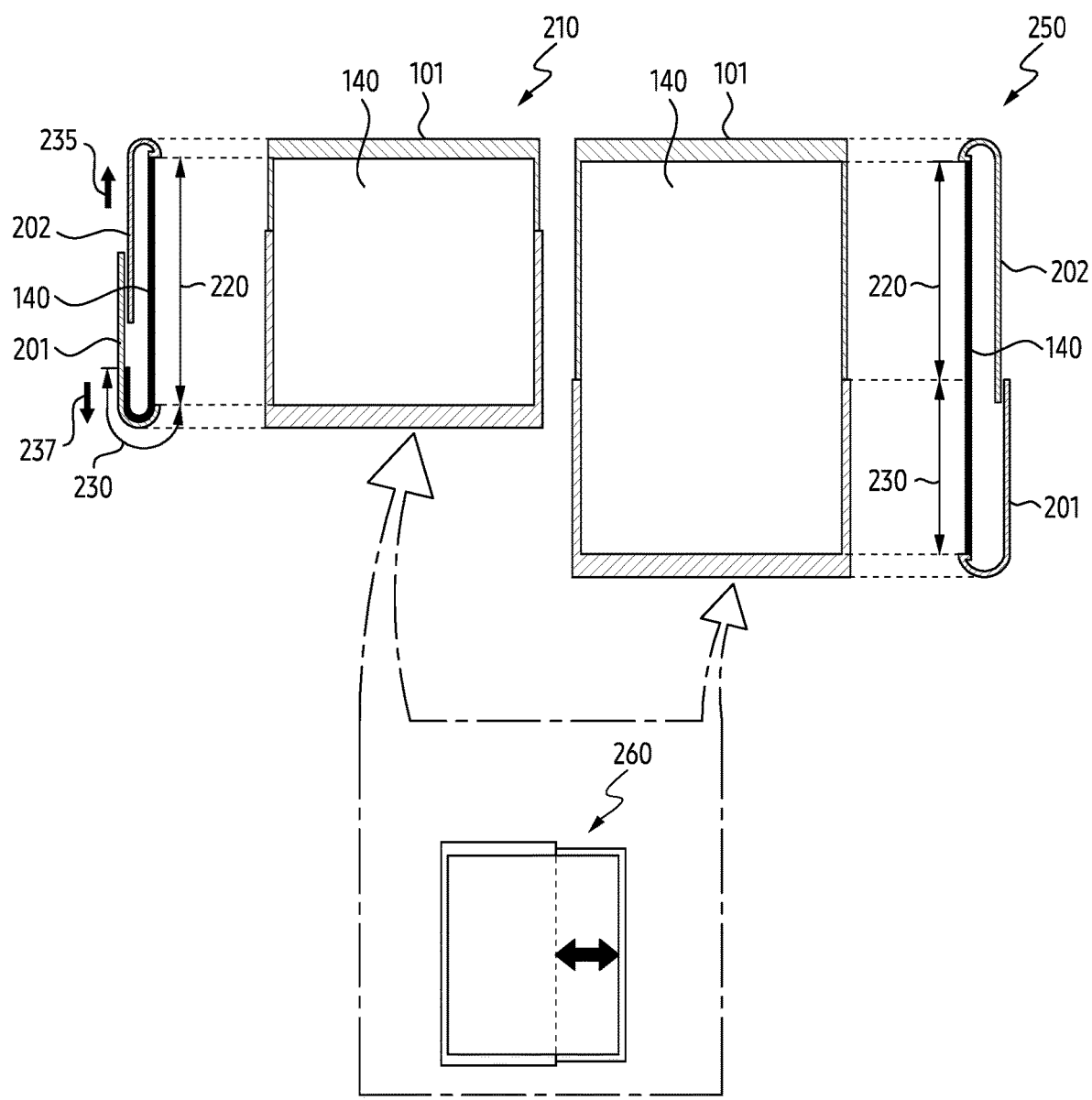
FIG. 2 illustrates an example of a change in size of a display region of a flexible display of an electronic device according to an embodiment of the disclosure.

FIG. 2 illustrates an example of a change in an area of the display region of a display of an electronic device according to an embodiment of the disclosure.

Referring to FIG. 2, the flexible display 140 may provide a first state 210, as one of the plurality of states, in which a portion of the flexible display 140 is exposed and the other portion of the flexible display 140 is inserted into a first housing 201 amongst the first housing 201 and a second housing 202. The first state 210 may be a state in which a viewable area of a minimum area (or size) is provided. The first state 210 may be a state in which the flexible display 140 provides a display region of a minimum area. In the first state 210, the display region having the minimum area may be referred to as a first area 220. In the first state 210, an area of the flexible display 140 that is inserted into the first housing 201 may be referred to as a second area 230. In the first state 210, the first area 220 may be a viewable area. In the first state 210, the first area 220 may be an area exposed outside the first housing 201. In the first state 210, the second area 230 may be a non-viewable area inserted into the first housing 201. In the first state 210, the second area 230 may be an area covered with the first housing 201 by being inserted into the first housing 201. For convenience of explanation, the disclosure assumes that the first housing 201 and the second housing 202 are formed of an opaque material and is not viewable when the second area 230 is inserted into the first housing 201. However, the disclosure is only an example, and at least a portion of the first housing 201 and/or the second housing 202 may be formed of a transparent material. In such a case, even when the second area 230 is inserted into the first housing 201, at least a portion of the second area 230 may be viewable through the first housing 201.

The flexible display 140 may provide a second state 250, as another state of the plurality of states, in which the flexible display 140 is exposed to the maximum. The second state 250 may be a state in which the flexible display 140 provides a viewable area of a maximum area (or size). The second state 250 may be a state in which the flexible display 140 provides a display region of a maximum area. In the second state 250, both the first area 220 and the second area 230 may be viewable areas. In the second state 250, the first area 220 and the second area 230 may be an area exposed out of the first housing 201.

Although not shown in FIG. 2, the flexible display 140 may provide an intermediate state between the first state 210 and the second state 250. The intermediate state may refer to a state in which the first area 220 and a portion of the second area 230 are exposed and the remaining portion of the second area 230 is inserted into the first housing 201. In the intermediate state, the first area 220 and the portion of the second area 230 may be viewable regions. In the intermediate state, the first area 220 and the portion of the second area 230 may be regions exposed outside the first housing 201. In the intermediate state, the remaining portion of the second area 230 may be a non-viewable region inserted into the first housing 201. In the intermediate state, the remaining portion of the second area 230 may be a display region covered with the first housing 201 being drawn into the first housing 201.

FIG. 2 illustrates an example in which the second housing 202 is moved or slid in a first direction 235 for switching from the first state 210 to the second state 250, but it is merely for convenience of explanation. For example, depending on the implementation or design of the electronic device 101, the first housing 201 may be moved or slid in a second direction 237 opposite to the first direction 235, for switching from the first state 210 to the second state 250.

The direction in which the display region is extended in case the display region is changed from the first state 210 to the second state 250, and the direction in which the display region is reduced in case the display region is changed from the second state 250 to the first state 210, may vary depending on a type of the electronic device 101. For example, the electronic device 101 may be implemented as the electronic device 260 including the flexible display 140 providing the display region extending in a first horizontal direction or reducing in a second horizontal direction opposite to the first horizontal direction, in a portrait mode. However, the disclosure is not limited thereto.

Figure 3:
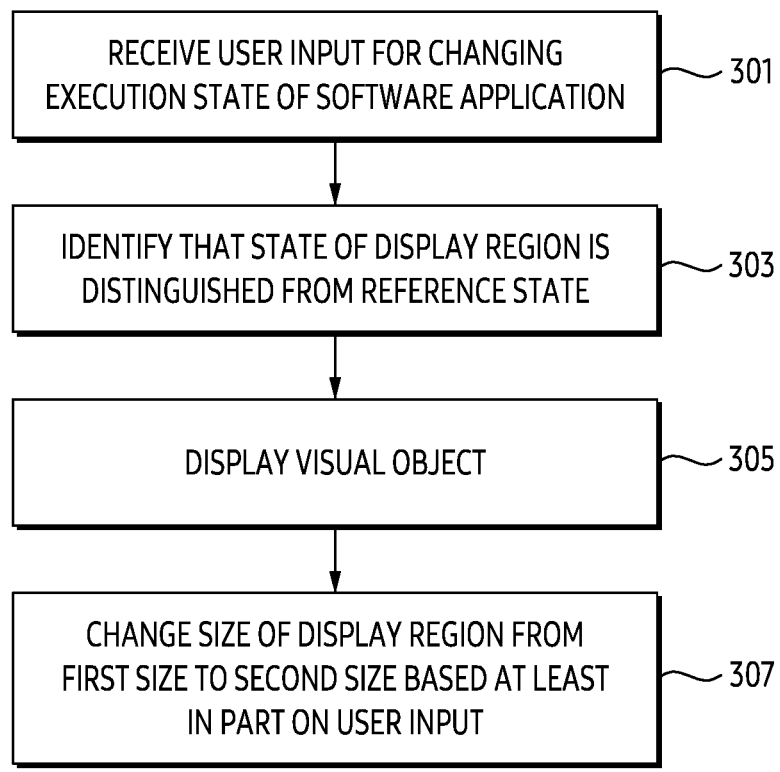
FIG. 3 illustrates an example method of displaying a visual object for changing a size of a display region according to an embodiment of the disclosure.

FIG. 3 illustrates an example method of displaying a visual object for changing a size of a display region according to an embodiment of the disclosure. This method may be executed by the electronic device 101 or the processor 120 of the electronic device 101 illustrated in FIG. 1.

Figure 4:
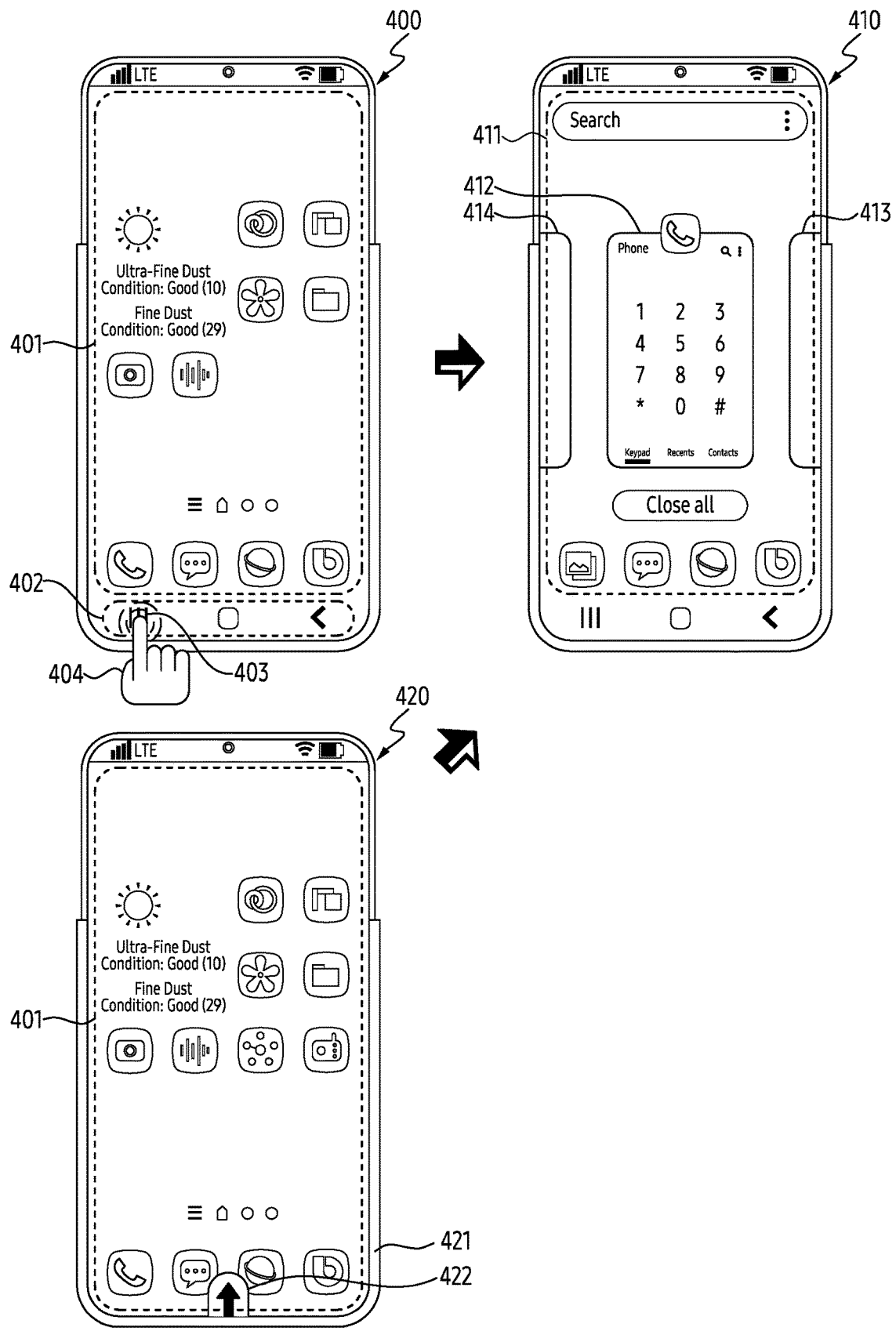
FIGS. 4 and 5 illustrate examples of user inputs for changing an execution state of a software application according to various embodiments of the disclosure.
Figure 5:
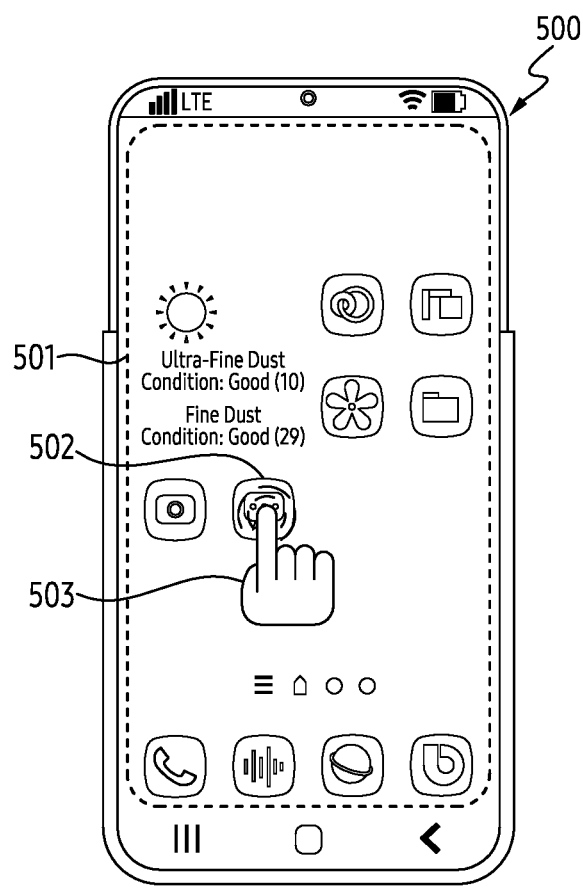

FIGS. 4 and 5 each illustrate examples of user inputs for changing an execution state of a software application according to various embodiments of the disclosure.

FIGS. 6, 7, 8A, and 8B each illustrate example visual objects for changing the size of the display region according to various embodiments of the disclosure.

Referring to FIG. 3, in operation 301, the processor 120 may receive a user input for changing an execution state of a software application.

The user input may be a user input for changing a state in which the software application is executed in a background to another state in which the software application is executed in a foreground. For example, the user input may be a user input for changing a state in which a user interface of a software application in execution is not displayed to another state in which the user interface is displayed.

The user input may be a user input for displaying a screen including a list of software applications in execution in the electronic device 101. For example, the user input may be a user input for calling the screen to change the state of each of the software applications from a state executed in the background to a state executed in the foreground, or change the state of each of the software applications from a state executed in the foreground to a state executed in the background.

For example, referring to FIG. 4, the processor 120 may display, in a state 400, a home screen 401 and a navigation bar 402. The processor 120 may receive, in the state 400, a user input 404 for an executable object 403 in the navigation bar 402 as the user input for displaying the screen. The processor 120 may change the state 400 to a state 410 in response to the user input 404. In the state 410, the processor 120 may display a screen 411 including a list of the software applications being executed in the electronic device 101. In the state 410, the screen 411 may include an image 412 corresponding to a user interface of a first software application having a reduced size amongst the software applications being executed in the electronic device 101. In the state 410, the screen 411 may further include a portion of an image 413 corresponding to a user interface of a second software application having a reduced size amongst the software applications and a portion of an image 414 corresponding to a user interface of a third software application having a reduced size amongst the software applications. For example, the screen 411 may be referred to as a recent apps (recent apps), an app switcher (app switcher), or a task manager, but the disclosure is not limited thereto.

As another example, the processor 120 may display the home screen 401 in a state 420. The processor 120 may receive, in the state 420, a touch input 422 caused around an edge 421 of the home screen 401, as the user input for displaying the screen, the touch input 422 having a predetermined pattern. The processor 120 may change the state 420 to the state 410 in response to the touch input 422, but the disclosure is not limited thereto.

Referring back to FIG. 3, the user input may be a user input for executing the software application. For example, the user input may be a user input for changing the state in which the software application is not executed to the state in which the software application is executed. In another example, the user input may be a user input in which an operating system (OS) installed in the electronic device 101 provides the software application with a process identifier.

For example, referring to FIG. 5, in a state 500, the processor 120 may display the home screen 501. In the state 500, the processor 120 may receive a user input 503 for an executable object 502 in the home screen 501 for executing a software application, as the user input for executing the software application, but the disclosure is not limited thereto.

Referring back to FIG. 3, in operation 303, the processor 120 may identify that the state of the display region of the flexible display 140 exposed out of the housing (e.g., the first housing 201) of the electronic device 101 is distinguished from a reference state, based on the user input received in operation 301.

The state of the display region may be identified based on identifying a size of the display region when the user input is received.

Identifying the state of the display region may include identifying that the display region has a first size corresponding to the first state 210 illustrated through the description of FIG. 2. Identifying the state of the display region may also include identifying that the display region has a second size corresponding to the second state 250 illustrated through the description of FIG. 2. Identifying the state of the display region may also include identifying that the display region has a third size corresponding to the intermediate state illustrated through the description of FIG. 2.

Identifying the state of the display region may include identifying that the display region has a first height corresponding to the first state 210 illustrated through the description of FIG. 2. Identifying the state of the display region may include identifying that the display region has a second height corresponding to the second state 250 illustrated through the description of FIG. 2. Identifying the state of the display region may include identifying that the display region has a third height corresponding to the intermediate state illustrated through the description of FIG. 2.

In response to the user input, the processor 120 may identify whether the state of the display region is the reference state, and may identify that the state of the display region is distinguished from the reference state based on identifying that the state of the display region is not the reference state.

The reference state may be a state of the display region when the user interface of the software application has been displayed before the user input is received in operation 301. For example, when the user interface has been displayed in the first state 210 defined through the description of FIG. 2 before the user input is received, the reference state may be the first state 210. As another example, when the user interface has been displayed in the second state 250 defined through the description of FIG. 2 before the user input is received, the reference state may be the second state 250. As another example, when the user interface has been displayed in the intermediate state defined through the description of FIG. 2 before the user input is received, the reference state may be the intermediate state.

When the user interface that has been last (or most recently) displayed before the user input is received is a user interface 1021 to be illustrated below with reference to FIG.

10, the reference state is a state 1020. When the user interface that has been last displayed before the user input is received is a user interface 1221 to be illustrated below with reference to FIG. 12, the reference state may be a state 1220. When the user interface that has been last displayed before the user input is received is a user interface 1321 to be illustrated below with reference to FIG. 13, the reference state may be a state 1320. When the user interface that has been last displayed before the user input is received is a user interface 1511, the reference state may be a state 1510. However, the disclosure is not limited thereto.

The processor 120 may store data on a state of the display region while displaying the user interface under a condition that the user interface is displayed, and identify the reference state in response to the user input, using the stored data.

The data may be stored in response to a change in the execution state of the software application. For example, in response to identifying that the execution state of the software application changes from a foreground state to a background state, the processor 120 may store the data on the state (or size) of the display region immediately before changing to the background state. However, the disclosure is not limited thereto.

The data may be stored in response to identifying the change in the size of the display region while the user interface is displayed. For example, in case where the state of the display region is changed multiple times while the user interface is displayed, the processor 120 may store and update the data whenever the state of the display region changes. The processor 120 may store the data on the most recent state of the display region based on the update; however, the disclosure is not limited thereto.

The data may include a value indicating a width of the display region and/or a value indicating a height of the display region. The data may include a value indicating a width of the user interface and/or a value indicating a height of the user interface. However, the disclosure is not limited thereto.

The reference state may be a state of the display region that has been most frequently provided to display the user interface. For example, when the user interface is displayed 'a' number of times in the display region having a first size and is displayed 'b' number of times, which is larger than the number 'a', in the display region having a second size, the reference state may be a state of providing the display region having the second size. For example, the reference state may be identified based on past display heuristics including a usage history of the software application. However, the disclosure is not limited thereto.

The reference state may be a state of the display region identified based on a user input. For example, the processor 120 may receive the user input for setting a state (e.g., size) of the display region when displaying the user interface. The processor 120 may identify the reference state based on the user input. However, the disclosure is not limited thereto.

The reference state may be a state of the display region identified based on arrangement of content in the user interface. In response to the user input, the processor 120 may identify the arrangement of the content in the user interface, and identify the reference state as a state of the display region having a width or a height corresponding to the arrangement of the content. The processor 120 may identify the reference state as either one of the first state 210, the second state 250, and the intermediate state, based on the identified arrangement. However, the disclosure is not limited thereto.

The reference state may be a state of the display region identified based on attributes of at least some of the content in the user interface. In response to the user input, the processor 120 may identify attributes of at least some of the content, and identify a state of the display region having a width or a height corresponding to the identified attributes, as the reference state. The processor 120 may identify the reference state as either one of the first state 210, the second state 250, and the intermediate state, based on the identified attributes. The processor 120 may identify the reference state as the first state 210, based on identifying that the aspect ratio of at least some of the content is 1:1. The processor 120 may identify the reference state as the second state 250, based on identifying that the height of at least some of the content is greater than the width of at least some of the content. However, the disclosure is not limited thereto.

The reference state may be a state of the display region identified based on the size of content in the user interface. In response to the user input, the processor 120 may identify a size of each of the content, and identify a state of the display region having a width or a height corresponding to the identified size, as the reference state can do. The processor 120 may identify the reference state as one of the first state 210, the second state 250, and the intermediate state, based on the identified size. However, the disclosure is not limited thereto.

The reference state may be a state of the display region identified based on the number of content items displayed in the user interface. For example, in case where the number of the content items in the user interface in the first state 210 is equal to the number of the content in the user interface in the second state 250, the processor 120 may identify the reference state as the first state 210. As another example, in case where the number of the content items in the user interface in the first state 210 is less than the number of the content items in the user interface in the second state 250, the processor 120 may identify the reference state as the second state 250. However, the disclosure is not limited thereto.

In operation 305, the processor 120 may display a visual object for guiding to change the state of the display region to the reference state, based on identifying that the state of the display region is distinguished from the reference state.

The visual object may be displayed in the screen including a list of software applications being executed in the electronic device 101. The visual object may be displayed in association with an image corresponding to the user interface of the software application having a reduced size.

Figure 6:
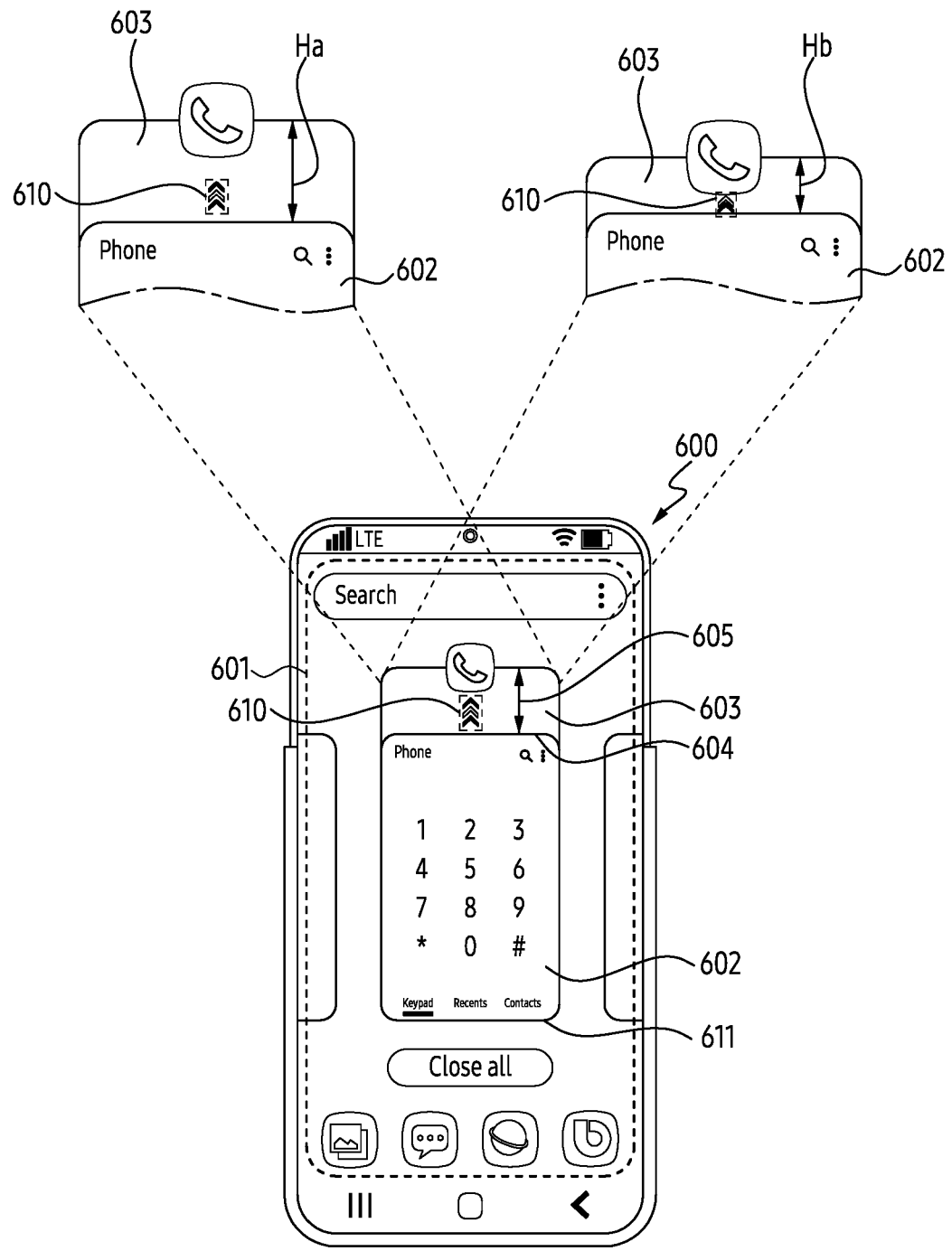
FIGS. 6, 7, 8A, and 8B each illustrate examples of visual objects for changing a size of a display region according to various embodiments of the disclosure.

For example, referring to FIG. 6, in a state 600, while the display region has a first size corresponding to the first state 210, the processor 120 may display a visual object 603 associated with an image 602 corresponding to the user interface of the software application having a reduced size, in the screen 601 including the list of software applications being executed in the electronic device 101. The visual object 603 may have a representation for indicating a second size, which is a size of the display region corresponding to the reference state, in order to indicate that the state of the display region is different from the reference state. The visual object 603, together with the image 602, may indicate the size of the user interface of the software application to be displayed in the display region having the second size.

The visual object 603 may be extended from an edge 604 of the image 602 by a height 605 corresponding to a difference between the first size and the second size. The height 605 may be changed depending on the difference between the first size and the second size. For example, when the second size corresponds to the second state 250, the height 605 may be 'Ha', and when the second size corresponds to an intermediate state between the first state 210 and the second state 205, the height 605 may be 'Hb' which is shorter than 'Ha'. However, the disclosure is not limited thereto; for example, the height 605 may be independent of the difference between the first size and the second size.

The height 605 may correspond to a ratio of the first size to the second size. However, the disclosure is not limited thereto; for example, the height 605 may be independent of the ratio of the first size to the second size.

The visual object 603 may further include a visual element 610 for indicating a direction in which the user interface of the software application is extended when the display region is changed to the second size. However, the disclosure is not limited thereto.

Although FIG. 6 illustrates an example in which visual object 603 is extended from the edge 604 of the image 602, the visual object 603 may be extended from an edge 611 of the image 602. The visual object 603 extending from the edge 611 of the image 602 may further include a visual element for indicating a direction opposite to the direction in which the user interface extends. For example, a shape of the visual element may correspond to that of the visual element 610. However, the disclosure is not limited thereto.

Figure 7:
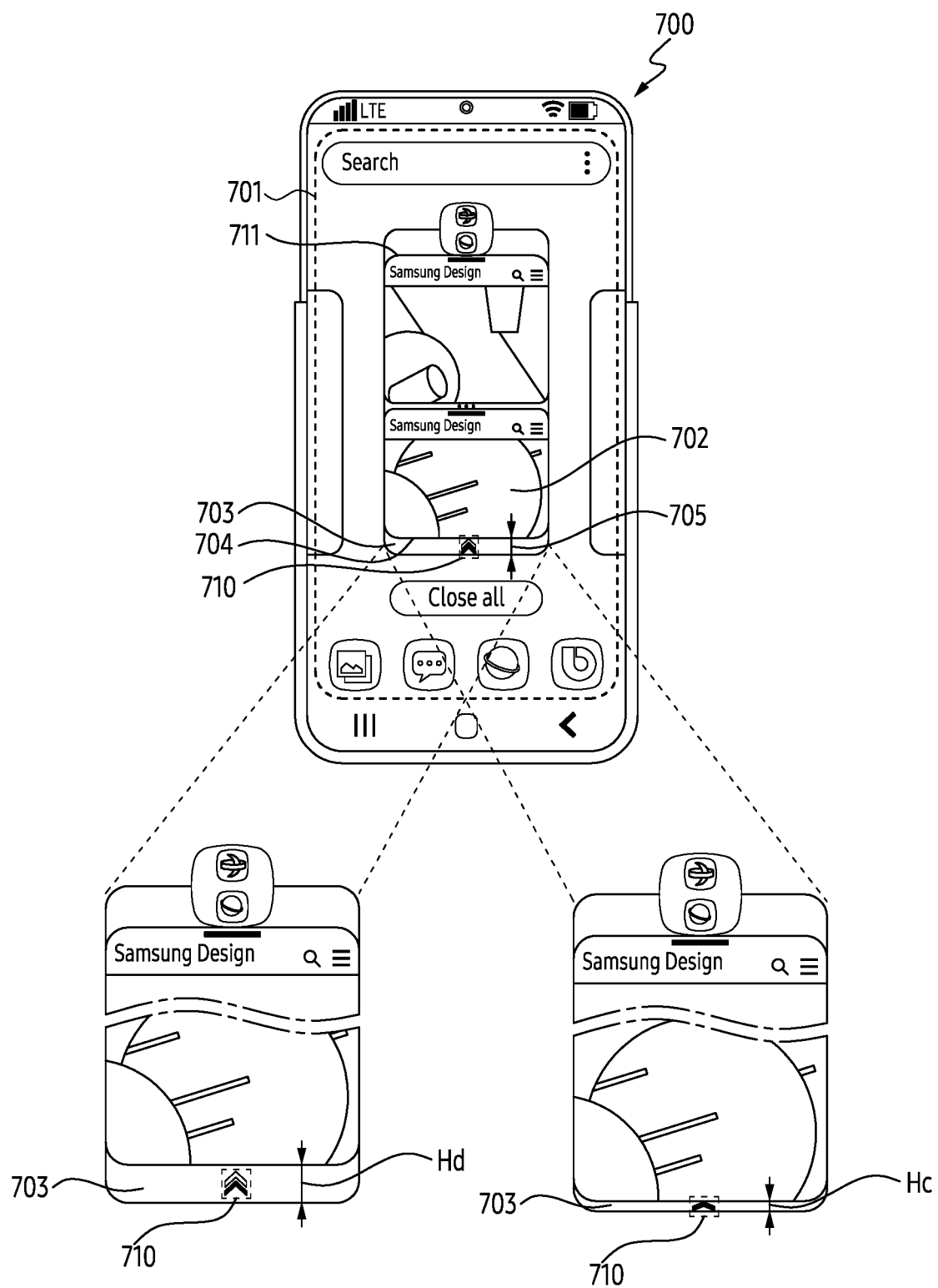

As another example, referring to FIG. 7, in a state 700, while the display region has the first size corresponding to the second state 250, the processor 120 may display a visual object 703 associated with an image 702 corresponding to the user interface of a software application having a reduced size, in a screen 701 including a list of the software applications being executed in the electronic device 101. The image 702 may have the second size, which is a size to indicate the reference state, unlike the image 602 in the state 600. The image 702 may correspond to the user interface displayed in the display region having the second size corresponding to the first state 210. In order to indicate that the state of the display region is different from the reference state, the visual object 703 may have a representation for indicating a difference between the first size and the second size (or a ratio of the first size to the second size) of the display region, unlike the visual object 603 in the state 600. Since the size of the area that are occupied by the image 702 and the visual object 703 adjacent to the image 702 corresponds to the first size, the visual object 703 may represent the difference. The visual object 703 may be extended by a height 705 corresponding to the difference between the first size and the second size (or a ratio of the first size to the second size) from an edge 704 of the image 702. The height 705 may change depending on the difference between the first size and the second size. For example, when the second size corresponds to the intermediate state between the first state 210 and the second state 250, the height 705 may be 'Hc', and when the second size corresponds to the first state, the height 705 may be which is greater than 'Hc'. However, the disclosure is not limited thereto. For example, the height 705 may be independent of the difference between the first size and the second size (or the ratio of the first size to the second size).

The visual object 703 may further include a visual element 710 for indicating a direction in which the user interface of the software application is reduced when the display region is changed to the second size. However, the disclosure is not limited thereto.

Although FIG. 7 illustrates an example case where the visual object 703 extends from the edge 704 of the image 702, the visual object 703 may extend from an edge 711 of the image 702. For example, the visual object 703 extending from the edge 711 of the image 702 may further include a visual element for indicating a direction in which the user interface or the display region is to be reduced. A shape of the visual element may correspond to that of the visual element 710. However, the disclosure is not limited thereto.

Although FIG. 7 illustrates an example case that the visual object 703 is adjacent to the image 702, it is only for convenience of description. For example, the visual object 703 may be replaced with another visual object superimposed on the image 702. The other visual object may be superimposed on the image 702 at a location adjacent to the edge 704. The other visual object may be superimposed on the image 702 at a location adjacent to the edge 711. A shape of the other visual object may correspond to that of the visual element 710.

Referring again to FIG. 3, the visual object may be displayed together with a user interface of the software application. For example, when the user input received in operation 301 is a user input to execute the software application, the processor 120 may display the visual object together with the user interface displayed in response to the execution of the software application, based on identifying that the state of the display region is distinguished from the reference state.

Figure 8A:
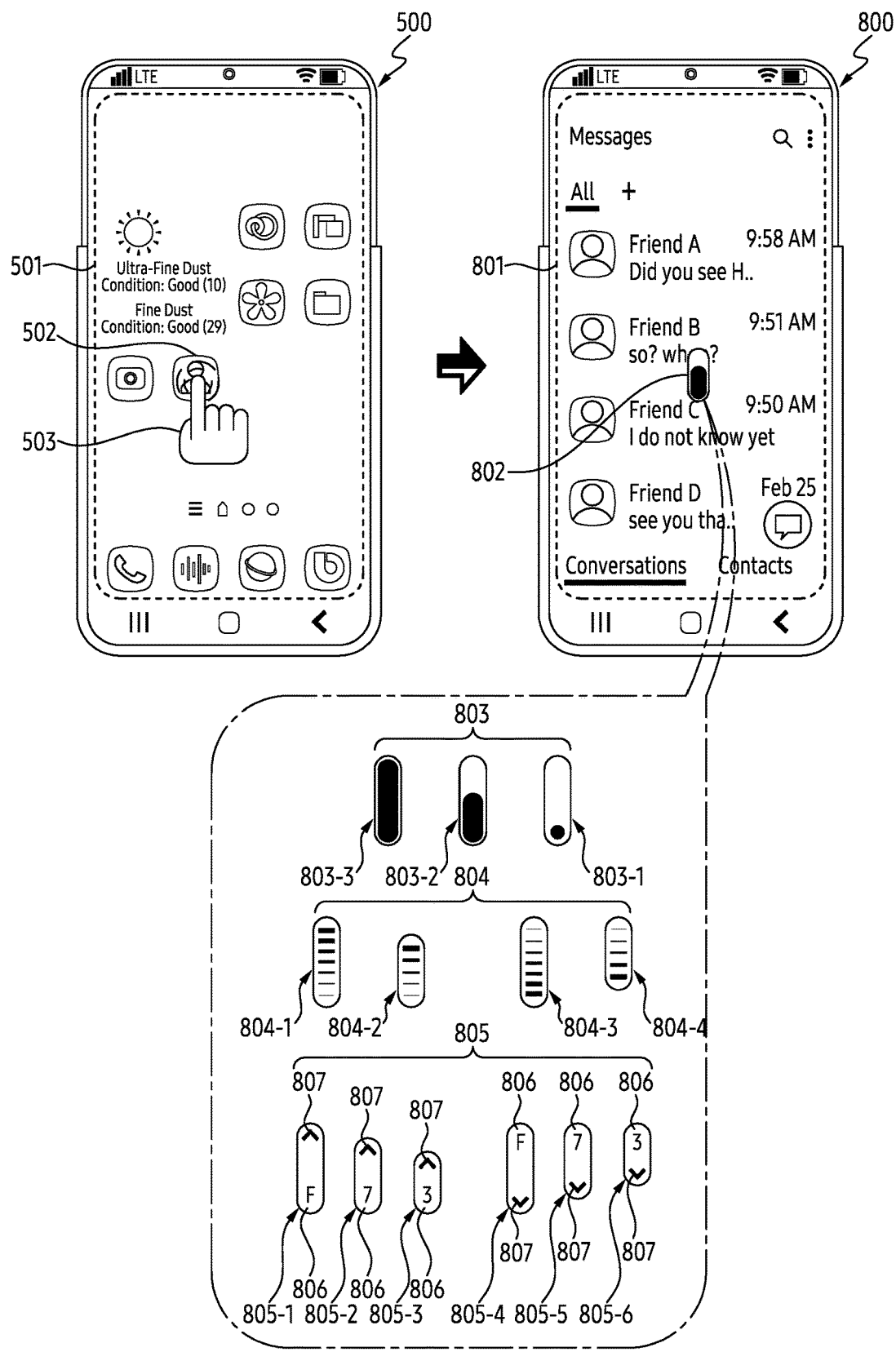

For example, referring to FIG. 8A, the processor 120 may provide a state 800, based on identifying that the state of the display region is distinguished from the reference state, in response to a user input 503 received in the state 500. For example, in the state 800, the processor 120 may display, in the display region having the first size, a visual object 802, which is the visual object, together with a user interface 801 of the software application executed in response to user input 503. The visual object 802 may be displayed at a position where the user input 503 was received in operation 301. For example, the visual object 802 may be displayed at the position where the user input 503 was received, so as to guide that it may be more appropriate to change the size of the display region to the second size. According to an embodiment of the disclosure, the visual object 802 may be superimposed or floated on the user interface 801. For example, the visual object 802 may be moved according to a drag input to the visual object 802. However, the disclosure is not limited thereto.

The visual object, such as the visual object 802, may have various shapes.

The visual object may include a visual element for indicating the second size corresponding to the reference state. For example, the visual object may include a bar-shaped indicator 803 including a gauge corresponding to the second size. The gauge in the bar-shaped indicator 803 may be provided to illustrate a length corresponding to the second size. The state of the gauge of the bar-shaped indicator 803 may vary depending on the second size. For example, when the second size corresponds to the first state 210, the bar-shaped indicator 803 may be displayed as a state 803-1; when the second size corresponds to the intermediate state in between the first state 210 and the second state 250, the bar-shaped indicator 803 may be displayed as a state 803-2; and the second size corresponds to the second state 250, the bar-shaped indicator 803 may be displayed as a state 803-3.

As another example, the visual object may include a visual element to indicate the second size, and to indicate whether the change from the first size to the second size is either a reduction in the display region or an extension in the display region. The visual object may include a visual element 804 having a length corresponding to the second size and having a different shape according to whether the change from the first size to the second size is a reduction in the display region or an extension in the display region. In the case where the first size corresponds to the first state 210 and the second size corresponds to the second state 250, the visual element 804 may be displayed as the state 804-1; in the case where the first size corresponds to the first state 210 and the second size corresponds to the intermediate state between the first state 210 and the second state 250, the visual element 840 may be displayed as the state 804-2; in the case where the first size corresponds to the second state 250 and the second size corresponds to the first state 210, the visual element 804 may be displayed as the state 804-3; and in the case where the first size corresponds to the second state 250 and the second size corresponds to the intermediate state, the visual element 804 may be displayed as the state 804-4.

The visual object may include a visual element including text to indicate the second size, and including an arrow 807 to indicate whether the change from the first size to the second size is a reduction in the display region or an extension in the display region. For example, the visual object may include a visual element 805 having a length corresponding to the second size, including text 806 corresponding to the second size, and including arrows to indicate whether the change from the first size to the second size is a reduction in the display region or an extension in the display region. When the change from the first size to the second size is an extension in the display region, the visual element 805 may be displayed as state 805-1, state 805-2, or state 805-3, while when the change from the first size to the second size is a reduction in the display region, the visual element 805 may be displayed as state 805-4, state 805-5, or state 805-6.

Referring back to FIG. 3, in operation 307, the processor 120 may change the size of the display region from the first size to the second size via the actuator 150, based at least in part on a user input received while the visual object is displayed. For example, the processor 120 may change the size of the display region from the first size to the second size, in response to the user input for the visual object. For example, the processor 120 may change the size of the display region from the first size to the second size, in response to a user input for other visual object displayed in response to a user input for the visual object. Examples of the user input in operation 307 are described below with respect to FIGS. 9, 10, 11, 12, 13, 14, and 15. However, the disclosure is not limited thereto.

Although not illustrated in FIG. 3, in operation 303, the processor 120 may identify that the state of the display region corresponds to the reference state. The processor 120 may bypass or refrain from executing operations 305 to 307, based on identifying that the state of the display region corresponds to the reference state. For example, the processor 120 may refrain from displaying the visual object, based on identifying that the state of the display region corresponds to the reference state. Based on identifying that the state of the display region corresponds to the reference state, the processor 120 may refrain from displaying an image corresponding to a user interface of each of the software applications having a reduced size, and displaying the visual object in association with the image, in a screen including a list of software applications being executed in the electronic device 101. The processor 120 may refrain from displaying the visual object together with the user interface of the software application, based on identifying that the state of the display region corresponds to the reference state.

Although not shown in FIG. 3, according to an embodiment of the disclosure, the visual object may be displayed around an executable object for executing a software application. For example, the visual object may be displayed around the executable object for executing the software application to guide the size of the display region identified for displaying of the user interface of the software application.

Figure 8B:
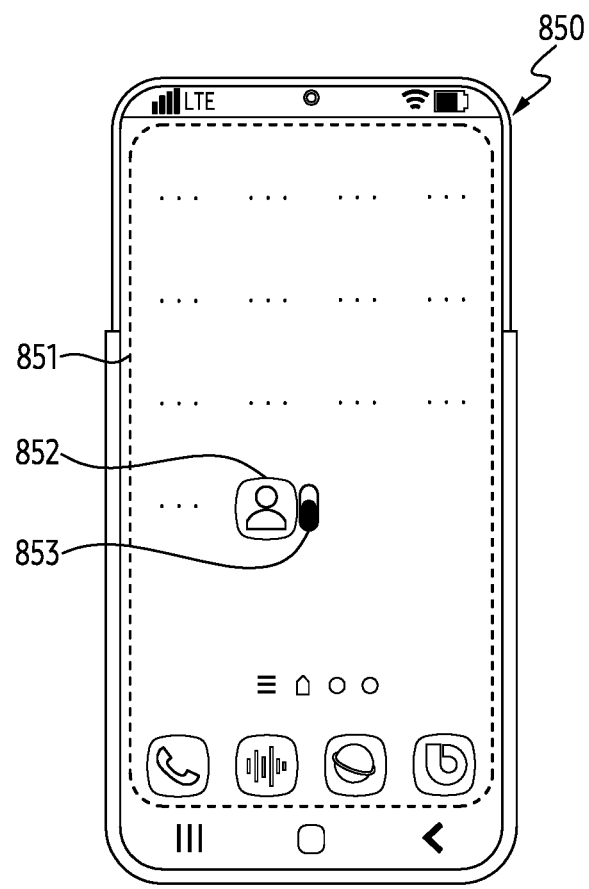

For example, referring to FIG. 8B, as in a state 850, the processor 120 may display a visual object 853, which is the visual object, next to an executable object 852 in a home screen 851 for executing the software application. For example, the visual object 853 may have a shape to indicate the second size. Although not shown in FIG. 8B, the processor 120 may change the size of the display region to the second size via the actuator 150, in response to a user input for the visual object 853, and display the user interface of the software application indicated by the executable object 852, in the display region having the second size. However, the disclosure is not limited thereto.

As described above, the electronic device 101 may display the visual object under the condition that the state of the display region is different from the reference state. Since the visual object guides that the state of the display region is different from the reference state and is used to change the state of the display region to the reference state, the electronic device 101 can provide an enhanced user experience by means of displaying of the visual object. The electronic device 101 may enhance usability of the user interface of the software application, by changing the size of the display region to the second size indicated by the visual object. The electronic device 101 may display the user interface having a recommended size by changing the size of the display region to the second size indicated by the visual object. However, the disclosure is not limited thereto.

Figure 9:
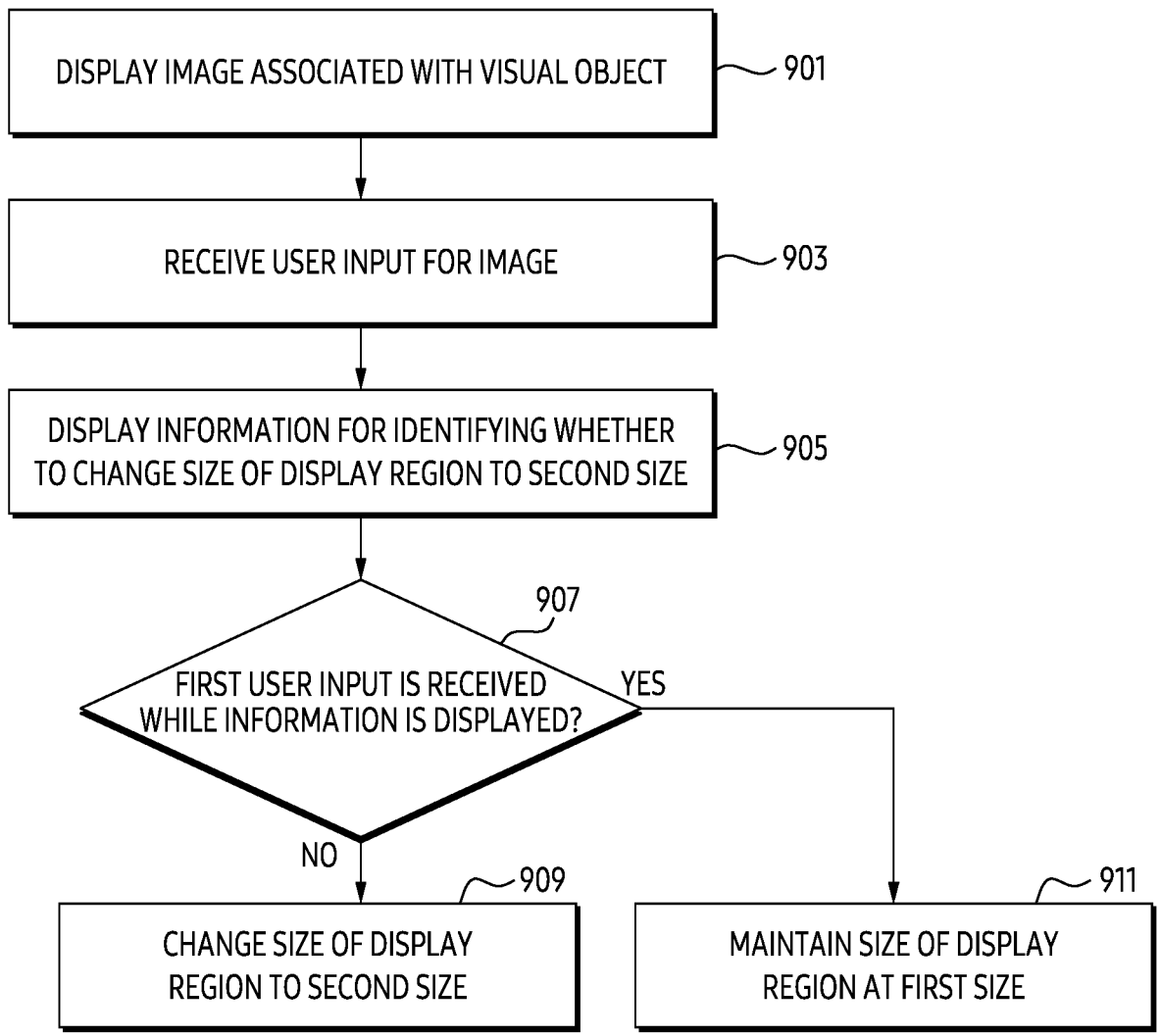
FIG. 9 illustrates an example method of displaying information for identifying whether to change a size of a display region according to an embodiment of the disclosure.

FIG. 9 illustrates an example method of displaying information for identifying whether to change the size of the display region according to an embodiment of the disclosure. This method can be executed by the electronic device 101 or the processor 120 of the electronic device 101 illustrated in FIG. 1.

Referring to FIG. 9, operation 901 of FIG. 9 may be included in operation 305 of FIG. 3, and operations 903 to 911 of FIG. 9 may be included in operation 307 of FIG. 3.

Figure 10:
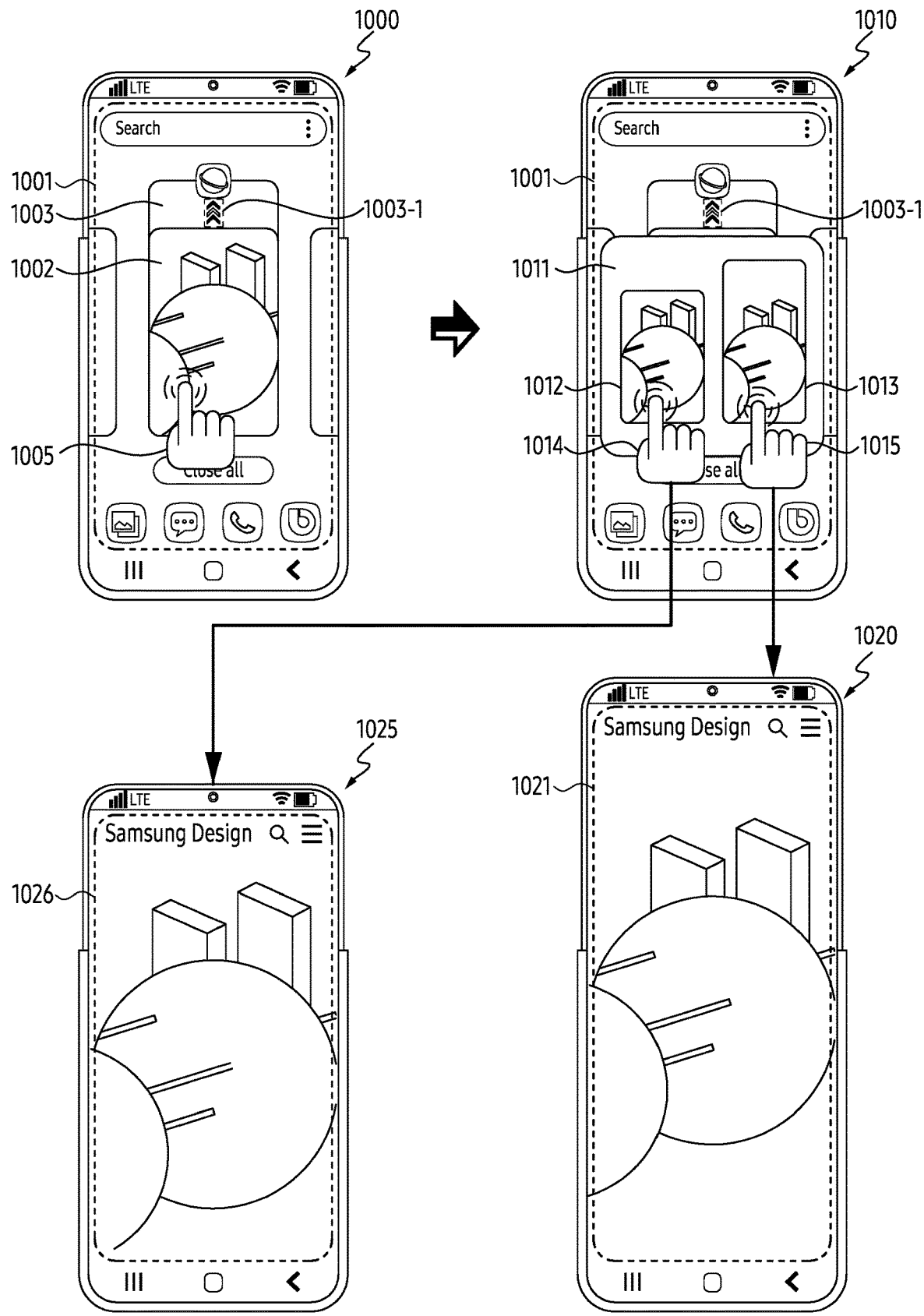
FIG. 10 illustrates an example of information for identifying whether to change a size of a display region according to an embodiment of the disclosure.

FIG. 10 illustrates an example of information for identifying whether to change the size of the display region according to an embodiment of the disclosure.

Referring to FIG. 9, in operation 901, the processor 120 may display an image corresponding to a user interface having a reduced size, the image being associated with the visual object in the display region having the first size, in the display region having the first size. For example, the image may be displayed in a screen including a list of software applications being executed in the electronic device 101.

For example, referring to FIG. 10, in a state 1000, the processor 120 may display a screen 1001 including a list of software applications being executed in the electronic device 101, based on identifying that the state of the display region is distinguished from the reference state. In the state 1000, the screen 1001 may include an image 1002 corresponding to a user interface of one of the software applications. In the state 1000, the image 1002 in the screen 1001 may be associated with a visual object 1003 to guide changing the state of the display region to the reference state. The visual object 1003 may further include a visual element 1003-1 for indicating a direction in which the user interface of the software application is to be extended when the display region is changed to the second size. However, the disclosure is not limited thereto.

Referring back to FIG. 9, in operation 903, the processor 120 may receive a user input for the image. For example, referring to FIG. 10, the processor 120 may receive a user input 1005 for the image 1002, in the state 1000.

Referring back to FIG. 9, in operation 905, the processor 120 may display information for identifying whether to change the size of the display region to the second size, in response to the user input. For example, referring to FIG. 10, the processor 120 may change the state 1000 to a state 1010 in response to the user input 1005. In the state 1010, the processor 120 may display information 1011 for identifying whether to change the size of the display region to the second size. The information 1011 may be superimposed on the screen 1001. According to an embodiment of the disclosure, the information 1011 may be visually highlighted with respect to screen 1001. For example, while the information 1011 is displayed, the screen 1001 may be blurred. However, the disclosure is not limited thereto.

The information 1011 may include a visual element 1012 indicating the first size that is the current size of the display region, and a visual element 1013 indicating the second size corresponding to the reference state. According to an embodiment of the disclosure, the visual element 1012 may include an image corresponding to the user interface displayed in the display region having the first size, and the visual element 1013 may include an image corresponding to the user interface displayed in the display region having the second size. However, the disclosure is not limited thereto.

Referring back to FIG. 9, in operation 907, the processor 120 may identify whether a first user input or a second user input is received while the information is displayed. For example, the first user input may be a user input for maintaining the size of the display region at the first size, and the second user input is a user input for changing the size of the display region to the second size. The processor 120 may perform operation 909 on condition that the first user input is received while the information is displayed, and perform operation 911 on condition that the second user input is received while the information is displayed.

In operation 909, the processor 120 may change the size of the display region to the second size, based on identifying that the second user input is received while the information is displayed. For example, referring to FIG. 10, in the state 1010, the processor 120 may receive a second user input 1015 to select a visual element 1013 among the visual element 1012 and the visual element 1013 in the information 1011. The processor 120 may change the state 1010 to the state 1020 in response to the second user input 1015. For example, the processor 120 may change the state 1010 to the state 1020, based on changing the size of the display region to the second size through the actuator 150. In the state 1020, the processor 120 may display the user interface 1021 of the software application in the display region having the second size.

Referring back to FIG. 9, in operation 911, the processor 120 may maintain the size of the display region as the first size, based on identifying that the first user input is received while the information is displayed. For example, referring to FIG. 10, in the state 1010, the processor 120 may receive a first user input 1014 to select a visual element 1012 from among the visual element 1012 and the visual element 1013 in the information 1011. The processor 120 may change the state 1010 to a state 1025 in response to the first user input 1014. In the state 1025, the processor 120 may maintain the size of the display region as the first size. For example, the processor 120 may display a user interface 1026 of the software application in the display region having the first size. Although not shown in FIG. 10, according to an embodiment of the disclosure, the user interface 1026 may be visually different from the user interface 1021. For example, since the first size and the second size are different from each other, the user interface 1026 may provide a smaller amount of information than the user interface 1021, or a size of at least some of the content in the user interface 1026 may be smaller than a size of at least some of the content in the user interface 1021. However, the disclosure is not limited thereto.

As described above, the electronic device 101 may display the information in response to a user input for the image associated with the visual object displayed based on identifying that the state of the display region is distinguished from the reference state. Since the information is available to inquire as to whether to maintain or change the size of the display region, the electronic device 101 may recognize the user's intention associated with the size of the display region through the display of the information. For example, the electronic device 101 may provide an enhanced user experience related to determination of the size of the display region through the information.

Figure 11:
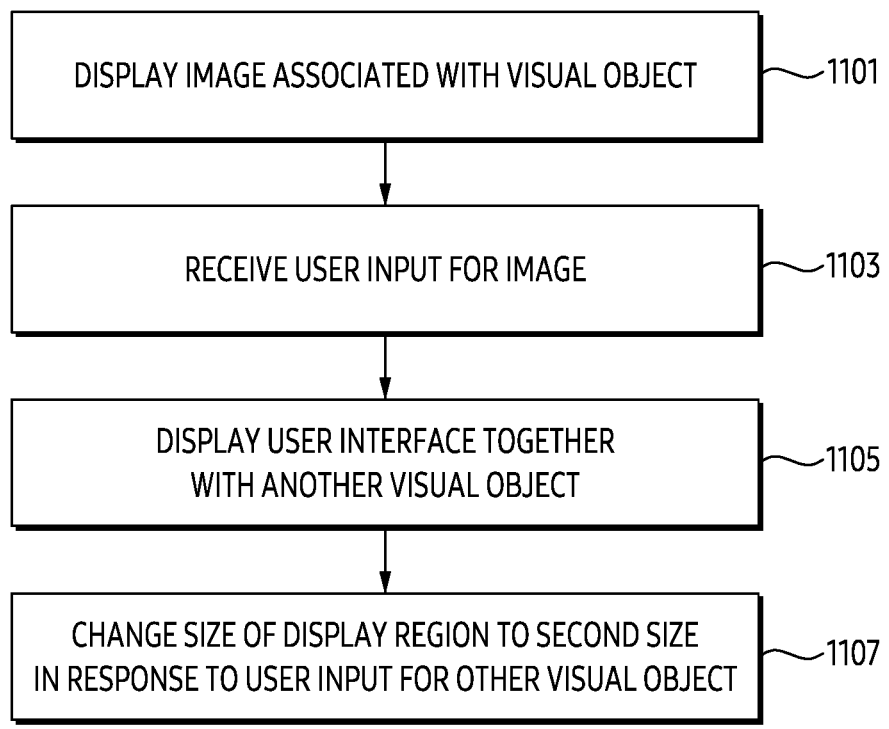
FIG. 11 illustrates an example method of displaying other visual object according to an embodiment of the disclosure.

FIG. 11 illustrates an example method of displaying another visual object. This method may be executed by the electronic device 101 or the processor 120 of the electronic device 101 illustrated in FIG. 1 according to an embodiment of the disclosure.

Referring to FIG. 11, operation 1101 of FIG. 11 may be included in operation 305 of FIG. 3, and operations 1103 to 1107 of FIG. 11 may be included in operation 307 of FIG. 3.

Figure 12:
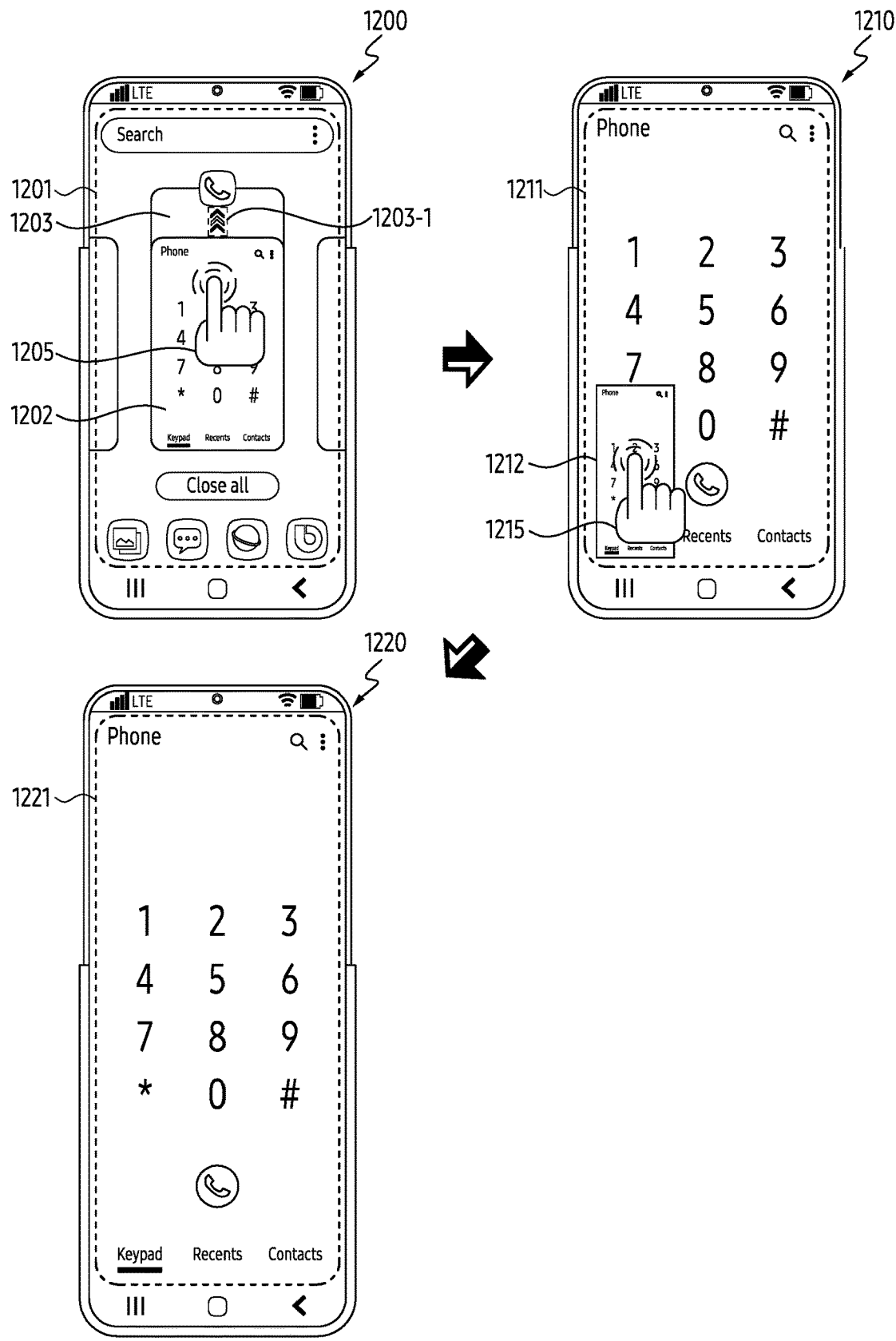
FIGS. 12 and 13 illustrate examples of other visual objects according to various embodiments of the disclosure.
Figure 13:
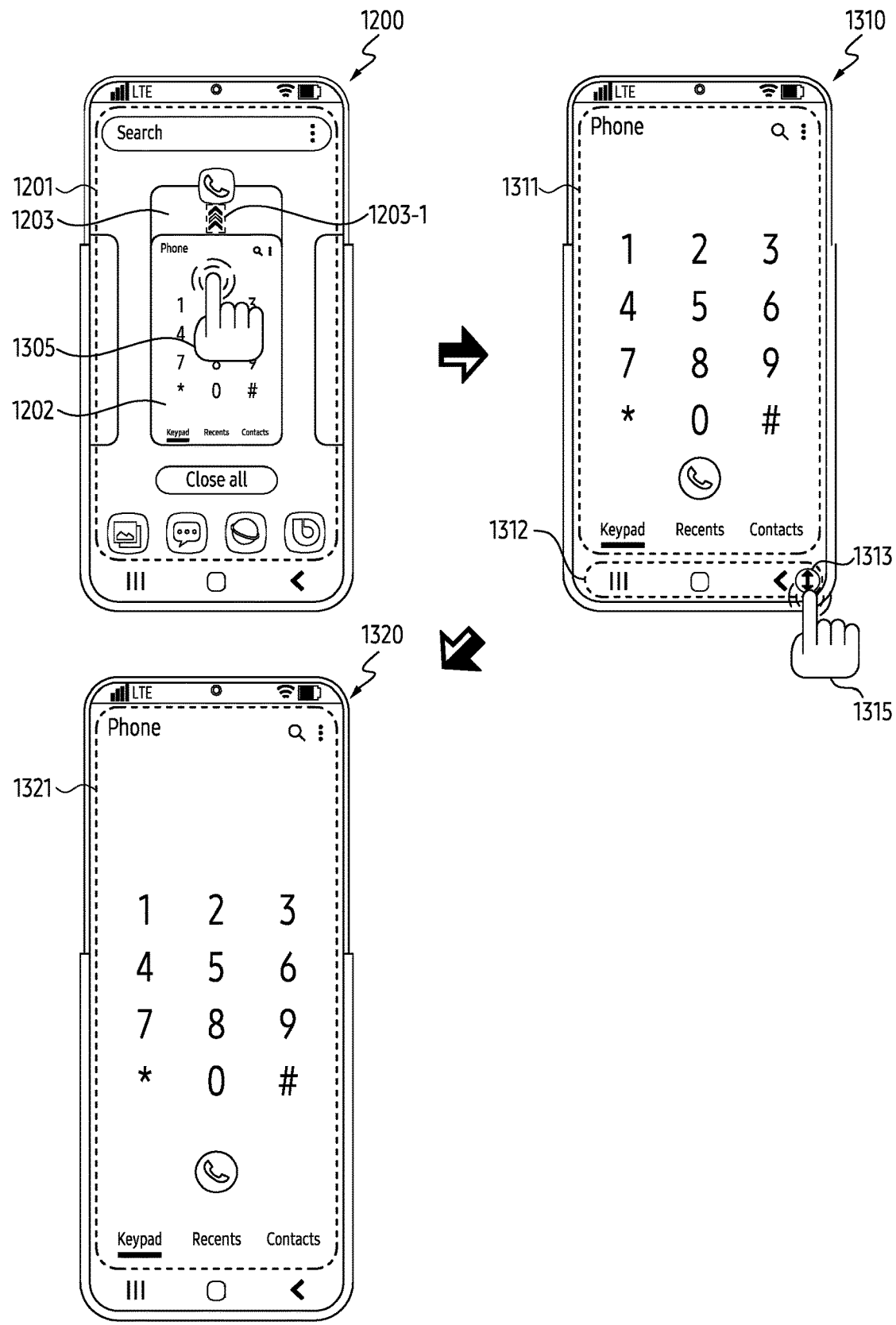

FIGS. 12 and 13 each illustrate examples of other visual objects according to various embodiments of the disclosure.

Referring to FIG. 11, in operation 1101, the processor 120 may display an image corresponding to a user interface associated with the visual object in the display region having the first size. For example, the image may be displayed in the screen including a list of software applications being executed in the electronic device 101.

For example, referring to FIGS. 12 and 13, in a state 1200, the processor 120 may display a screen 1201 including a list of software applications being executed in the electronic device 101, based on identifying that the state of the display region is distinguished from the reference state. In the state 1200, the screen 1201 may include an image 1202 corresponding to a user interface of one of the software applications. In the state 1200, the image 1202 in the screen 1201 may be associated with a visual object 1203 for guiding to change the state of the display region to the reference state. The visual object 1203 may further include a visual element 1203-1 for indicating a direction in which the user interface of the software application is extended when the display region is changed to the second size. However, the disclosure is not limited thereto.

Referring back to FIG. 11, in operation 1103, the processor 120 may receive a user input for the image. For example, the user input may be a single tap input for the image, which may be an input for executing the software application indicated by the image in the foreground. However, the disclosure is not limited thereto.

In operation 1105, in response to the user input for the image, the processor 120 may display the user interface together with another visual object in the display region having the first size. For example, the other visual object may be a visual object for changing the size of the display region to the second size.

The other visual object may include an image corresponding to the user interface displayed in the display region having the second size. For example, referring to FIG. 12, in the state 1200, the processor 120 may receive a user input 1205 for the image 1202. The processor 120 may change the state 1200 to the state 1210 in response to the user input 1205. In the state 1210, the processor 120 may display a user interface 1211 of the software application. In the state 1210, the processor 120 may display another visual object 1212, along with user interface 1211. A size of the other visual object 1212 may correspond to a size of a user interface (e.g., the user interface 1221 in the state 1220) of the software application displayed within the display region having the second size. The other visual object 1212 may be superimposed or floated on the user interface 1211. For example, the other visual object 1212 may be moved in response to a drag input to the other visual object 1212. In the state 1210, the other visual object 1212 may disappear after being displayed for a predetermined time duration. However, the disclosure is not limited thereto.

Referring again to FIG. 11, the other visual object may be displayed in a navigation bar. For example, referring to FIG. 13, in the state 1200, the processor 120 may receive a user input 1305 for the image 1202. The processor 120 may change the state 1200 to a state 1310 in response to the user input 1305. In the state 1310, the processor 120 may display a user interface 1311 of the software application. In the state 1310, the processor 120 may display another visual object 1313 along with the user interface 1311. The other visual object 1313 may be displayed in the navigation bar 1312, unlike the other visual object 1212. The other visual object 1313 may be superimposed or floated on the navigation bar 1312. The other visual objects 1313 may be included within the navigation bar 1312 as an additional executable element in the bar 1312. However, the disclosure is not limited thereto. In the state 1310, the other visual object 1312 may disappear after being displayed for a predetermined time duration. However, the disclosure is not limited thereto.

Referring back to FIG. 11, in operation 1107, the processor 120 may change the size of the display region to the second size, in response to a user input for the other visual object. For example, referring to FIG. 12, in the state 1210, the processor 120 may receive a user input 1215 for the other visual object 1212. The processor 120 may change the state 1210 to the state 1220 in response to the user input 1215. The processor 120 may change the state 1210 to the state 1220 by changing the size of the display region from the first size to the second size via the actuator 150 in response to the user input 1215. For example, in the state 1220, the processor 120 may display the user interface 1221 of the software application in the display region having the second size.

In another example, referring to FIG. 13, the processor 120 may receive a user input 1315 for the other visual object 1312 in the state 1310. The processor 120 may change the state 1310 to the state 1320 in response to the user input 1315. For example, the processor 120 may change the state 1310 to the state 1320 by changing the size of the display region from the first size to the second size via the actuator 150 in response to the user input 1315. In the state 1320, the processor 120 may display the user interface 1321 of the software application in the display region having the second size.

As described above, the electronic device 101 can display the other visual object, in response to a user input for changing the state of the software application being executed in the electronic device 101 to a state to execute in the foreground, as the user input received in operation 1103. Since the other visual object is available to change the size of the display region to the second size, the electronic device 101 can provide enhanced usability of the user interface 101 through the other visual object. For example, in order to enhance accessibility of changing the size of the display region through the other visual object, the electronic device 101 may display the other visual object as being superposed on the user interface or display the other visual object in the navigation bar.

Figure 14:
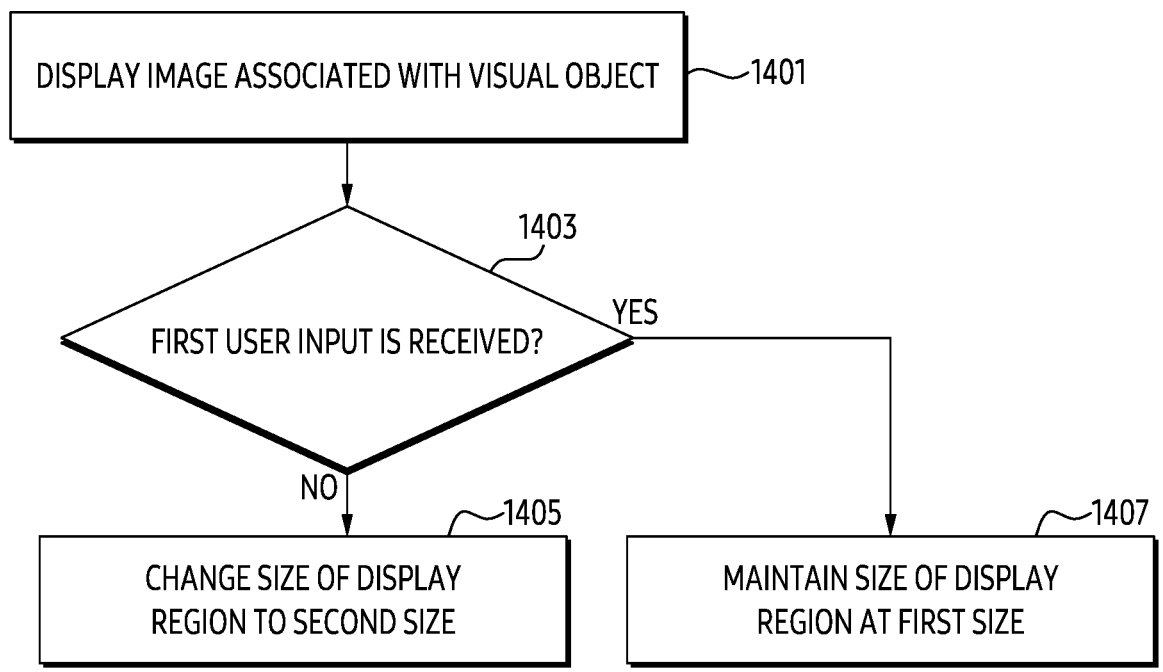
FIG. 14 illustrates an example method for adaptively changing a size of a display region according to a user input for an image associated with a visual object according to an embodiment of the disclosure.

FIG. 14 illustrates an example method of adaptively changing a size of a display region according to a user input for an image associated with a visual object according to an embodiment of the disclosure. This method may be executed by the electronic device 101 or the processor 120 of the electronic device 101 illustrated in FIG. 1.

Referring to FIG. 14, operation 1401 of FIG. 14 may be included in operation 305 of FIG. 3, and operations 1403 to 1407 of FIG. 14 may be included in operation 307 of FIG. 3.

Figure 15:
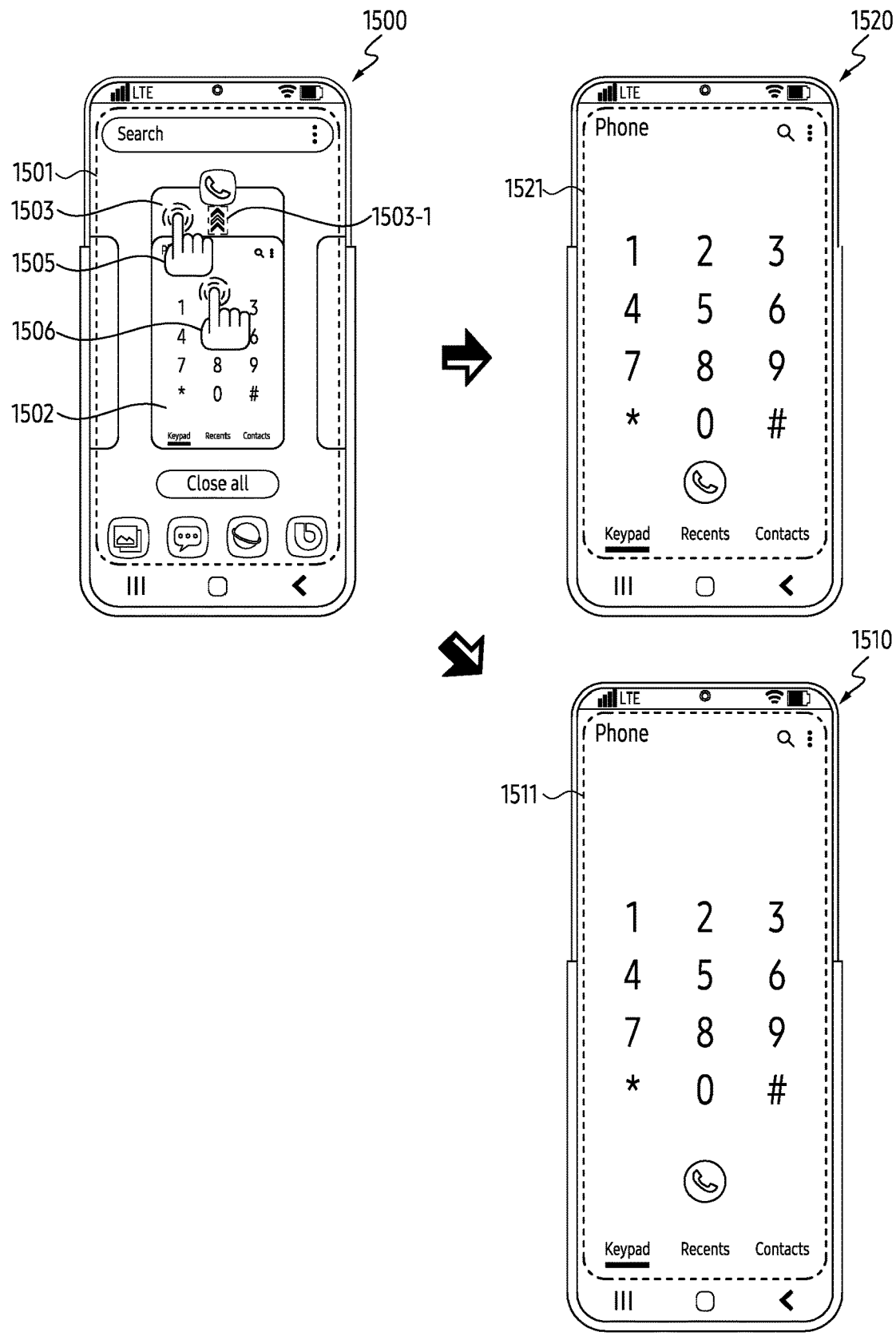
FIG. 15 illustrates an example of an adaptive change in size of a display region according to a user input according to an embodiment of the disclosure.

FIG. 15 illustrates an example of an adaptive change in size of a display region according to a user input according to an embodiment of the disclosure.

Referring to FIG. 14, in operation 1401, the processor 120 may display an image associated with the visual object in the display region having the first size. For example, the image may be an executable object displayed in a screen including a list of software applications being executed in the electronic device 101.

For example, referring to FIG. 15, in a state 1500, the processor 120 may display a screen 1501 including a list of software applications being executed in the electronic device 101, based on identifying that the state of the display region is distinguished from the reference state. For example, in the state 1500, the screen 1501 may include an image 1502 corresponding to a user interface of one of the software applications. In the state 1500, the image 1502 in the screen may be associated with a visual object 1503 for guiding to change the state of the display region to the reference state. For example, the visual object 1503 may further include a visual element 1503-1 for indicating a direction in which the user interface of the software application is to be extended when the display region is changed to the second size. However, the disclosure is not limited thereto.

Referring back to FIG. 14, in operation 1403, the processor 120 may identify whether a first user input is received or a second user input is received while the image associated with the visual object is displayed. For example, the first user input may be an input indicating that the image is selected from among the image and the visual object, and the second user input may be an input indicating that the visual object is selected from the image and the visual object. For example, the processor 120 may execute operation 1407 on condition that the first user input is received while the image associated with the visual object is displayed, and may execute operation 1405 on condition that the second user input is received while the image associated with the visual object is displayed.

In operation 1405, the processor 120 may change the size of the display region to the second size, based on identifying that the second user input is received while the image associated with the visual object is displayed. For example, referring to FIG. 15, the processor 120 may receive, in the state 1500, a second user input 1505 for a visual object 1503 from among the image 1502 and the visual object 1503. The processor 120 may change the state 1500 to the state 1510 in response to the second user input 1505. For example, the processor 120 may change the state 1500 to the state 1510 by changing the size of the display region to the second size via actuator 150 in response to the second user input 1505. In the state 1510, the processor 120 may display the user interface 1511 of the software application. According to an embodiment of the disclosure, the second user input 1505 may be a touch input having a point of contact on the visual element 1503-1 in the visual object 1503. However, the disclosure is not limited thereto.

Referring back to FIG. 14, in operation 1407, the processor 120 may maintain the size of the display region at the first size, based on identifying that the first user input is received while the image associated with the visual object is displayed. For example, referring to FIG. 15, the processor 120 may receive, in the state 1500, a first user input 1506 for the image 1502 from among the image 1502 and the visual object 1503. The processor 120 may change the state 1500 to the state 1520 in response to the first user input 1506. In the state 1520, the processor 120 may display a user interface 1521 of the software application in the display region having the first size. According to an embodiment of the disclosure, although not shown in FIG. 15, the processor 120 may display another visual object, such as the other visual object 1212 in FIG. 12 or the other visual object 1313 in FIG. 13, along with the user interface 1521. However, the disclosure is not limited thereto.

As described above, the electronic device 101 may change or maintain the size of the display region according to a touch input received while the image associated with the visual object is displayed. For example, the electronic device 101 may maintain the size of the display region when the touch input is received for the image, and change the size of the display region when the touch input is received for the visual object, thereby enhancing the user's convenience related to adjustment of the size of the display region.

Figure 16:
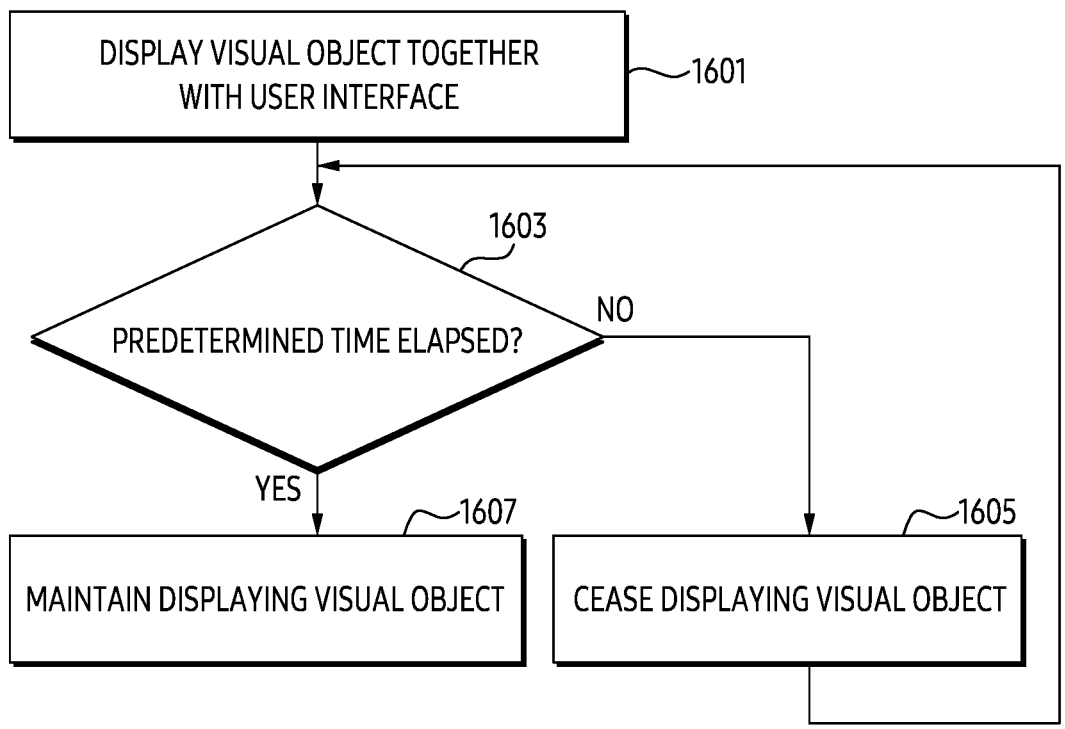
FIG. 16 illustrates an example method of ceasing displaying of a visual object with the lapse of a predetermined time according to an embodiment of the disclosure.

FIG. 16 illustrates an example method of ceasing displaying of the visual object with the lapse of a predetermined time according to an embodiment of the disclosure. This method may be executed by the electronic device 101 or the processor 120 of the electronic device 101 illustrated in FIG. 1.

Referring to FIG. 16, operations 1601 to 1607 of FIG. 16 may be included in operation 305 of FIG. 3.

Figure 17:
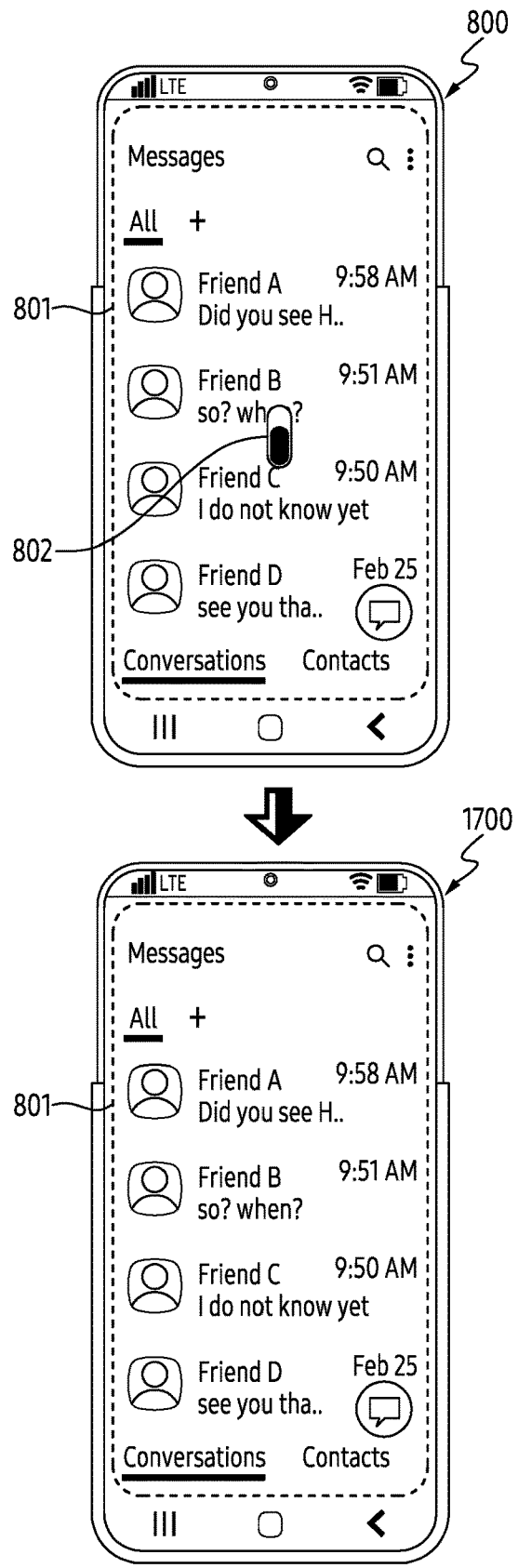
FIG. 17 illustrates an example of a visual object of which displaying ceases with the lapse of a predetermined time according to an embodiment of the disclosure.

FIG. 17 illustrates an example of a visual object of which displaying is ceased with the lapse of a predetermined time according to an embodiment of the disclosure.

Referring to FIG. 16, in operation 1601, the processor 120 may display the visual object together with the user interface of the software application, in the display region having the first size.

For example, referring to FIG. 17, as in the state 800, the processor 120 may display the visual object 802 together with the user interface 801 in the display region having the first size.

Referring again to FIG. 16, in operation 1603, in response to displaying of the visual object, the processor 120 may identify whether a predetermined time has elapsed from the timing point of displaying the visual object. For example, the processor 120 may execute operation 1605 while the predetermined time has not yet elapsed from the timing point, and execute operation 1607 on condition that the predetermined time has elapsed from the timing point.

In operation 1605, the processor 120 may maintain displaying the visual object while identifying that the predetermined time has not elapsed from the timing point. In order to provide a function of changing the size of the display region while the predetermined time has not elapsed from the timing point, the processor 120 may maintain displaying the visual object. For example, referring to FIG. 17, the processor 120 may maintain the state 800 while the predetermined time has not elapsed from the timing point.

Referring again to FIG. 16, in operation 1607, the processor 120 may cease displaying the visual object in response to identifying that the predetermined time has elapsed from the timing point. Since the predetermined time elapsing from the timing point may mean that the user intends to maintain the size of the display region at the first size, the processor 120 may cease displaying of the visual object on condition that the predetermined time has elapsed from the timing point. For example, referring to FIG. 17, in the state 800, the processor 120 may identify that the predetermined time has elapsed from the timing point. The processor 120 may change the state 800 to a state 1700 in response to the identification. In the state 1700, the processor 120 may cease to display the visual object 802 along with the user interface 801, as opposed to the state 800. In the state 1700, the visual object 802 may disappear from the display region having the first size.

As described above, the electronic device 101 may adaptively cease displaying of the visual object. For example, the predetermined time elapsing after displaying the visual object may mean that the user's intention is to maintain the size of the display region, and thus, the electronic device 101 can cease displaying the visual object, thereby providing enhanced visibility of the user interface displayed together with the visual object.

Figure 18:
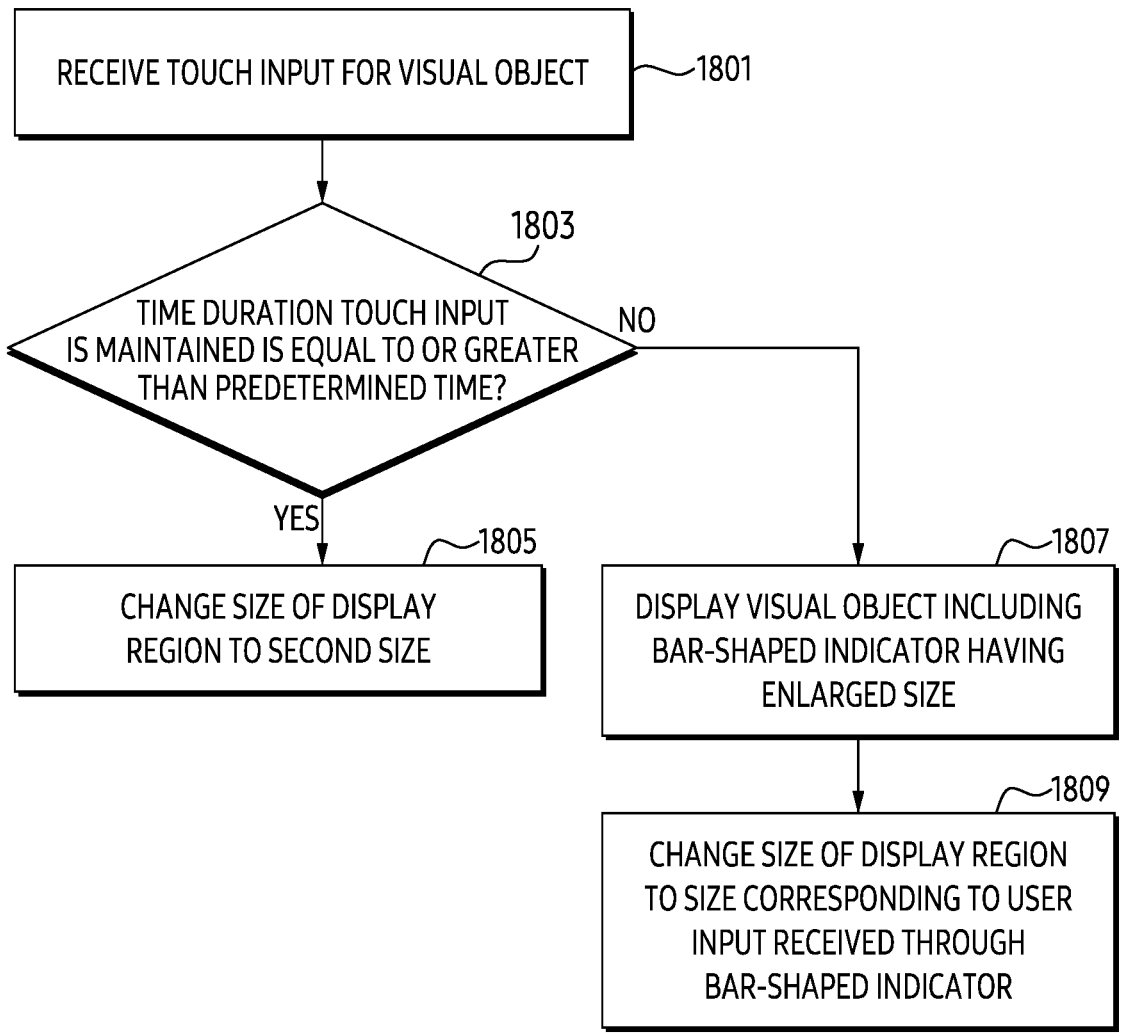
FIG. 18 illustrates an example method of identifying a size of a display region by means of at least one input to a visual object according to an embodiment of the disclosure.

FIG. 18 illustrates an example method of identifying a size of a display region through at least one input to a visual object according to an embodiment of the disclosure. This method may be executed by the electronic device 101 or the processor 120 of the electronic device 101 illustrated in FIG. 1.

Referring to FIG. 18, operations 1801 to 1809 of FIG. 18 may be included in operation 307 of FIG. 3.

Figure 19:
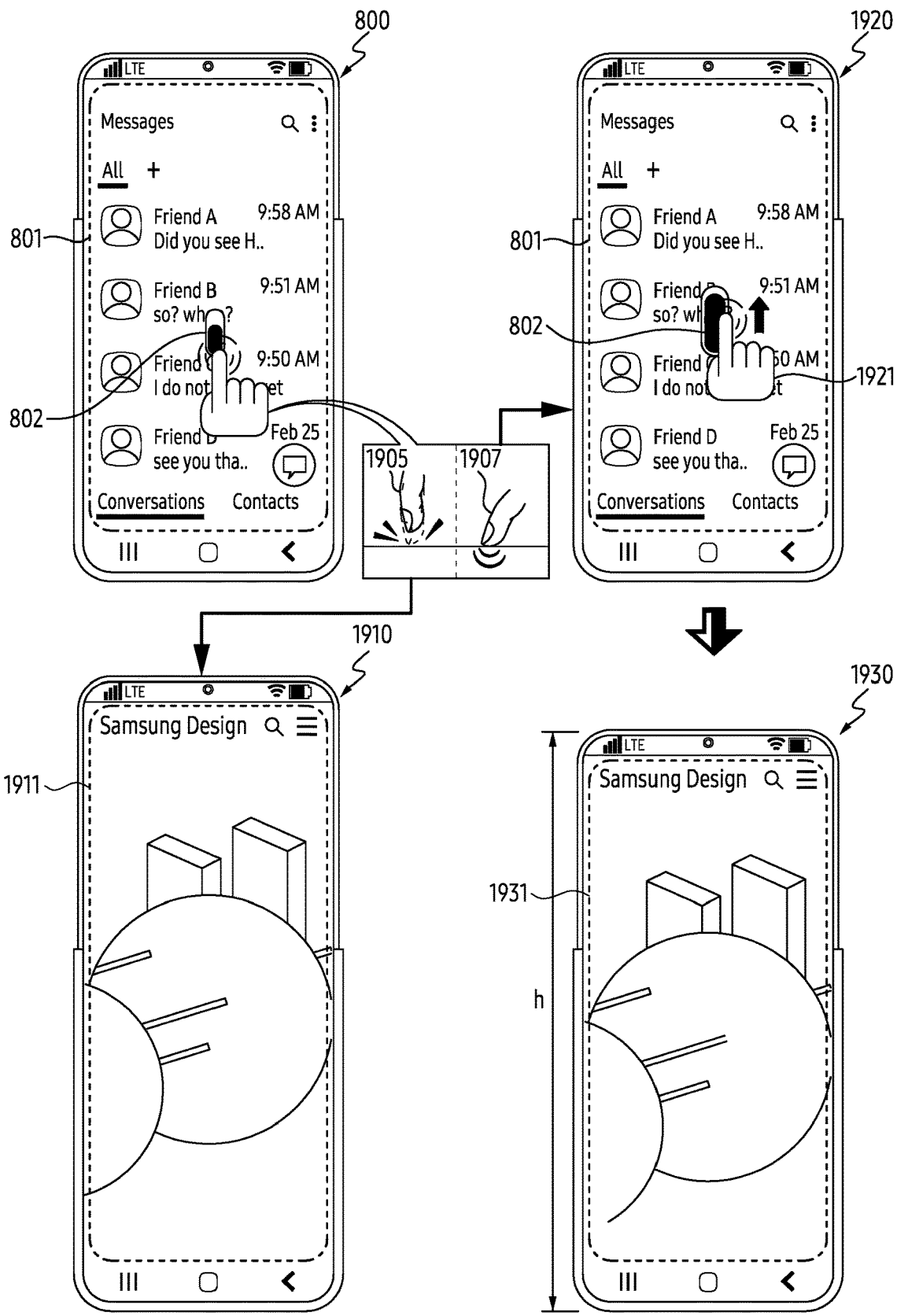
FIG. 19 illustrates an example of a visual object including a visual element for identifying a size of a display region according to an embodiment of the disclosure.

FIG. 19 illustrates an example of a visual object including a visual element for identifying a size of a display region according to an embodiment of the disclosure.

Referring to FIG. 18, in operation 1801, the processor 120 may receive a touch input for the visual object displayed together with the user interface.

For example, referring to FIG. 19, the processor 120 may display a visual object 802 together with a user interface 801 in the display region having the first size, as in the state 800.

Referring again to FIG. 18, in operation 1803, the processor 120 may identify whether a time duration for which the touch input is maintained is equal to or greater than a predetermined time. For example, the processor 120 may execute operation 1805 on condition that the touch input is released before the predetermined time elapses, and execute operation 1807 on condition that the touch input is maintained until the predetermined time elapses.

In operation 1805, the processor 120 may change the size of the display region to the second size, in response to the touch input on the visual object that is released before the predetermined time elapses. In operation 1805, the processor 120 may change the size of the display region to the second size, by recognizing the touch input as a single tap input for the visual object. For example, referring to FIG. 19, in the state 800, the processor 120 may receive a touch input 1905 released before the predetermined time elapses. The processor 120 may change the state 800 to the state 1910 in response to the touch input 1905. In the state 1910, the processor 120 may change the state 800 to the state 1910, by changing the size of the display region to the second size via the actuator 150 in response to touch input 1905. In the state 1910, the processor 120 may display a user interface 1911 of the software application.

Referring again to FIG. 18, in operation 1807, in response to a touch input on the visual object maintained for the predetermined time or longer, the processor 120 may display the visual object including a bar-shaped indicator having an enlarged size. In order to provide a function of changing the size of the display region to a different size distinguished from the second size, the processor 120 may display the visual object including the bar-shaped indicator having the enlarged size. For example, referring to FIG. 19, in the state 800, the processor 120 may receive a touch input 1907 maintained for the predetermined time or longer. The processor 120 may change the state 800 to the state 1920 in response to the touch input 1907. In the state 1920, the processor 120 may display the visual object 802 having the enlarged size along with the user interface 801. The visual object 802 displayed in the state 1920 may, in contrast to the visual object 802 displayed in the state 800, be enlarged to provide a function to control the size of the display region. According to an embodiment of the disclosure, the visual object 802 in the state 1920 may be visually highlighted with respect to the user interface 801 or with respect to the visual object 802 in the state 800. However, the disclosure is not limited thereto.

Referring again to FIG. 18, in operation 1809, the processor 120 may change the size of the display region to a size corresponding to a user input received via the bar-shaped indicator having the enlarged size. For example, referring to FIG. 19, in the state 1920, the processor 120 may receive a user input 1921 through the visual object 802 having the enlarged size. The user input 1921 may be defined with maintaining the touch input 1907. The user input 1921 may be an input subsequent to the touch input 1907. However, the disclosure is not limited thereto. For example, the user input 1921 may be an input for adjusting a length of a gauge in the visual object 802. The processor 120 may change the state 1920 to a state 1930 in response to the user input 1921. The processor 120 may change the state 1920 to the state 1930, by changing the size of the display region to a size defined based on the user input 1921 through the actuator 150 in response to the user input 1921. In the state 1930, the processor 120 may display a user interface 1931 of the software application in the display region having a size defined based on the user input 1921. A height h of the display region provided in the state 1930 may be longer than a height provided through the first state 210, and shorter than a height provided through the second state 250. However, the disclosure is not limited thereto.

As described above, the electronic device 101 can provide, in response to a long press input for the visual object, a function capable of enlarging the visual object and inputting the size of the display region through the enlarged visual object. For example, the electronic device 101 can adaptively provide the size of the display region by means of providing such a function.

FIG. 20 illustrates an example method of displaying a visual object based on identification of a content intersected with an edge of a display region according to an embodiment of the disclosure. This method may be executed by the electronic device 101 or the processor 120 of the electronic device 101 illustrated in FIG. 1.

Figure 21:
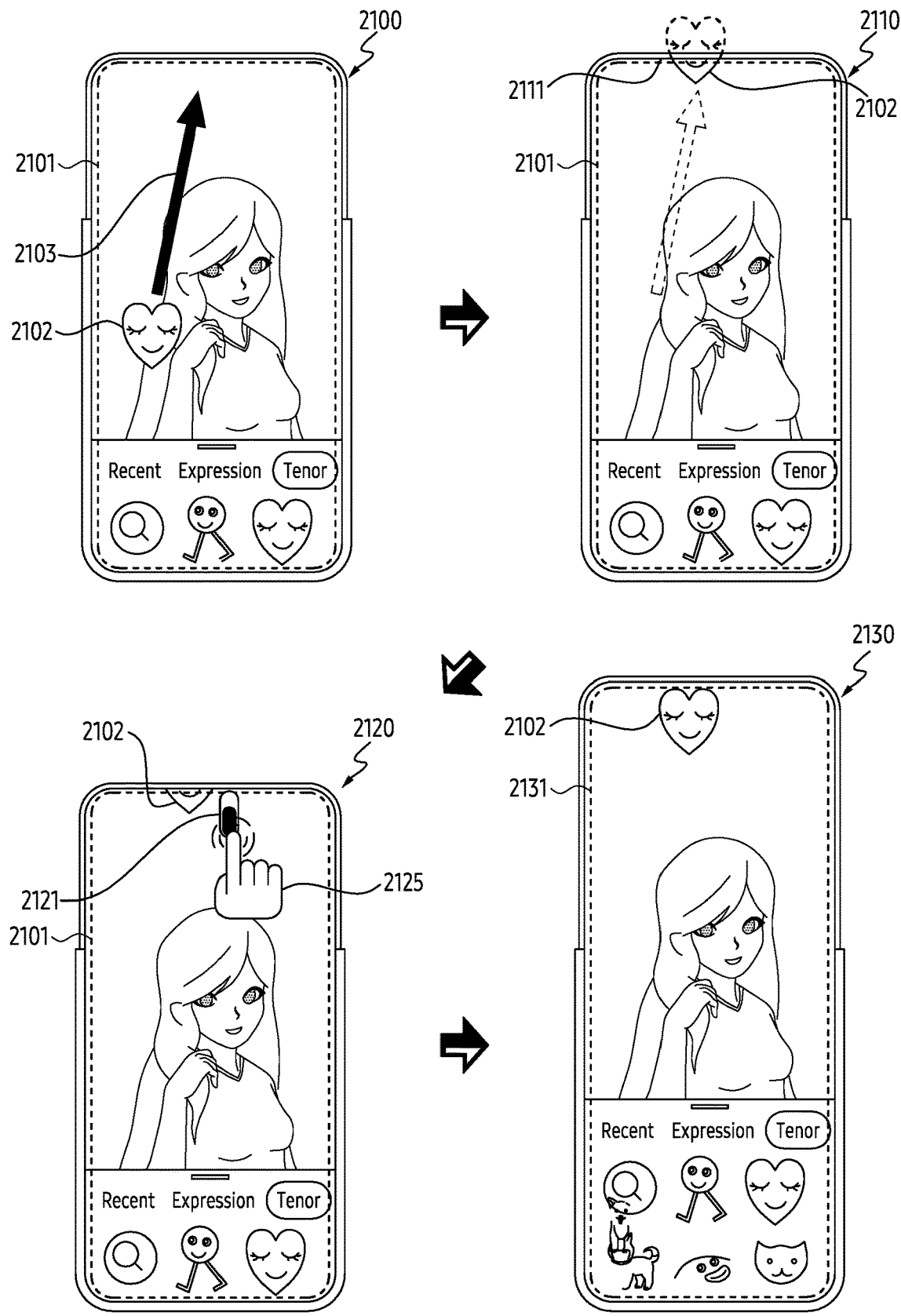
FIG. 21 illustrates an example of a visual object displayed based on identification of a content intersected with a periphery of a display region according to an embodiment of the disclosure.

FIG. 21 illustrates an example of a visual object displayed based on the identification of a content intersected with an edge of a display region according to an embodiment of the disclosure.

Referring to FIG. 20, in operation 2001, the processor 120 may identify, while a user interface of a software application is displayed, that the content in the user interface intersects an edge of a display region of the flexible display 140 exposed out of the housing (e.g., the first housing 201). For example, the content may intersect the edge by a scroll input (or a sweeping input) received while the user interface is displayed. For example, the content may intersect the edge according to a drag and drop touch input of the content. However, the disclosure is not limited thereto.

For example, referring to FIG. 21, in a state 2100, the processor 120 may receive a user input 2103 to move a content 2102 in a user interface 2101 while the user interface 2101 of a software application is displayed. The processor 120 may change the state 2100 to a state 2110 in response to the user input 2103. In the state 2110, the processor 120 may display the user interface 2101 including the content 2102 at a location identified based on the user input 2103. In the state 2110, the processor 120 may identify that the content 2102 moved to the position is intersected with an edge 2111 of the display region. In the state 2110, displaying of a portion of the content 2102 may cease upon intersection with the edge 2111.

Referring back again to FIG. 20, in operation 2003, the processor 120 may display a visual object for guiding a change in the state of the display region around the content based on the identification. For example, referring to FIG. 21, in the state 2110, the processor 120 may change the state 2110 to a state 2120, in response to identifying that the content 2102 is intersected with the edge 2111, or displaying of a portion of the content 2102 ceases according to the intersection with the edge 2111. In the state 2120, the processor 120 may further display a visual object 2121. For example, the visual object 2121 may be displayed around the content 2102 of which displaying has partially ceased.

Referring again to FIG. 20, in operation 2005, the processor 120 may, in response to a user input for the visual object, extend the display region through the actuator 150 so as to resume displaying of the portion of the content that was ceased according to the intersection with the edge. For example, referring to FIG. 21, the processor 120 may receive a user input 2125 for the visual object 2121 in the state 2120. The processor 120 may change the state 2120 to a state 2130 in response to the user input 2125. For example, the processor 120 may change the state 2120 to the state 2130 by extending the display region via the actuator 150 in response to the user input 2125. The extended display region, provided in the state 2130, may display a user interface 2131 including the entirety of the content 2102, as opposed to the display region in the state 2120.

The operations illustrated through FIGS. 20 and 21 are not inextricably linked with the operations illustrated through FIGS. 3, 4, 5, 6, 7, 8A, 8B, 9, 10, 11, 12, 13, 14, 15, 16, 17, 18, and 19.

As described above, in the state that the display region is extendable, the electronic device 101 may display the visual object, in response to identifying whether the display of a portion of the content in the display region is ceased, and identifying that the display of the portion of the content has ceased. The electronic device 101 can reduce the user's inconvenience that may be caused when the display of the portion of the content has ceased, by providing a function capable of extending the display region through displaying of the visual object. For example, the electronic device 101 can provide an enhanced user experience through displaying of the visual object.

FIG. 22A is a front view of an electronic device in a first state according to an embodiment of the disclosure. FIG. 22B is a rear view of an electronic device in a first state according to an embodiment of the disclosure. FIG. 22C is a front view of an electronic device in a second state according to an embodiment of the disclosure. FIG. 22D is a rear view of an electronic device in a second state according to an embodiment of the disclosure.

Referring to FIGS. 22A, 22B, 22C, and 22D, an electronic device 2200 (e.g., the electronic device 101 of FIG. 1) according to an embodiment of the disclosure may include a first housing 2210, a second housing 2220, a display 2230 (e.g., the display 140 of FIG. 1), and a camera 2240. The second housing 2220 may be slidable with respect to the first housing 2210. For example, the second housing 2220 may move within a range of a designated distance in a first direction (e.g., +y direction) with respect to the first housing 2210. When the second housing 2220 moves in the first direction, a distance between the side surface 2220a of the second housing 2220 facing the first direction and the first housing 2210 may increase. As another example, the second housing 2220 may move within a range of a designated distance in a second direction (e.g., −y direction) opposite to the first direction with respect to the first housing 2210. When the second housing 2220 moves in the second direction, the distance between the side surface 2220a of the second housing 2220 facing the first direction and the first housing 2210 may decrease. The second housing 2220 may linearly reciprocate with respect to the first housing 2210 by sliding relative to the first housing 2210. For example, at least a portion of the second housing 2220 may be slidable (pulled-in) into the first housing 2210 or slidable (pulled-out) out of the first housing 2210.

According to an embodiment of the disclosure, the electronic device 2200 may be referred to as a "slidable electronic device", when the second housing 2220 is designed to be slidable with respect to the first housing 2210. According to another embodiment of the disclosure, the electronic device 2200 may be referred to as a "rollable electronic device", when at least a portion of the display 2230 is designed to be rolled up within the second housing 2220 (or the first housing 2210 based on the sliding movement of the second housing 2220.

The first state of the electronic device 2200 may be defined as a state that the second housing 2220 is moved in the second direction (e.g., −y direction) (e.g., a contracted state or a slide-in state). For example, in the first state of the electronic device 2200, the second housing 2220 may be movable in the first direction, but may not be movable in the second direction. In the first state of the electronic device 2200, a distance between the side surface 2220a of the second housing 2220 and the first housing 2210 may increase as the second housing 2220 moves. In another example, in the first state of the electronic device 2200, a portion of the second housing 2220 may be slidable-out the first housing 2210. In the first state of the electronic device 2200, it may be impossible that the second housing 2220 is slid in with respect to the first housing 2210. According to an embodiment, the first state of the electronic device 2200 may be defined as a state in which a second area 2230b of the display 2230 is not visually exposed from the outside of the electronic device 2200. For example, in the first state of the electronic device 2200, the second area 2230b of the display 2230 is located in an internal space (not shown) within the electronic device 2200 formed by the first housing 2210 and/or the second housing 2220, so that it may not be visible from the outside of the electronic device 2200.

The second state of the electronic device 2200 may be defined as a state (e.g., an extended state or a slide-out state) in which the second housing 2220 is moved in the first direction. For example, in the second state of the electronic device 2200, the second housing 2220 may be movable in the second direction, but the second housing 2220 may not be movable in the first direction. In the second state of the electronic device 2200, the distance between a side surface 2220a of the second housing 2220 and the first housing 2210 may decrease as the second housing 2220 moves, but it may not increase. In another example, in the second state of the electronic device 2200, a portion of the second housing 2220 may be able to slide in into the first housing 2210, but the second housing may not be able to slide out from the first housing 2210. The second state of the electronic device 2200 may be defined as a state in which the second area 2230b of the display 2230 is visually exposed from the outside of the electronic device 2200. For example, in the second state of the electronic device 2200, the second area 2230b of the display 2230 may be pulled-out from the internal space of the electronic device 2200, so that the second area 2230b is visible from the outside of the electronic device 2200.

When the second housing 2220 moves from the first housing 2210 in the first direction (e.g., +y direction), at least a portion of the second housing 2220 and/or the second area 2230b of the display 2230 may slide out from the first housing 2210 by a pull-out length d1 corresponding to a movement distance of the second housing 2220. The second housing 2220 may reciprocate within a designated distance d2. The pull-out length d1 may have a size in a range of substantially zero to the designated distance d2.

The state of the electronic device 2200 may be convertible between the second state and/or the first state, by means of either a manual operation by a user or an automatic operation by a driving module (not shown) disposed in the first housing 2210 or the second housing 2220. According to an embodiment of the disclosure, the operation of the driving module may be triggered based on a user input. The user input for triggering the operation of the driving module may include a touch input, a force touch input, and/or a gesture input through the display 2230. According to another embodiment of the disclosure, the user input for triggering the operation of the driving module may include, for example, a voice input or a user input onto a physical button exposed out of the first housing 2210 or the second housing 2220. The driving module may be driven in a semi-automatic manner in which an operation is triggered upon detection of a manual manipulation by a user's external force is detected.

The first state of the electronic device 2200 may be referred to as a first shape, and the second state of the electronic device 2200 may be referred to as a second shape. For example, the first shape may include a normal state, a reduced state, or a closed state, and the second shape may include an open state. The electronic device 2200 may have a third state (e.g., an intermediate state) in between the first state and the second state. The third state may be referred to as a third shape, and the third shape may include a free stop state.

The display 2230 may be visible or viewable from the outside through a front direction (e.g., −z direction) of the electronic device 2200 so as to display visual information to the user. For example, the display 2230 may include a flexible display. The display 2230 may be disposed in the second housing 2220 and may be pulled out from an internal space (not shown) of the electronic device 2200 according to the movement of the second housing 2220 or may be pulled-in into the internal space of 2200 of the electronic device. The internal space of the electronic device 2200 may refer to an internal space within the first housing 2210 and the second housing 2220, being formed by a coupling of the first housing 2210 and the second housing 2220. For example, in the first state of the electronic device 2200, at least a portion of the display 2230 may be slid in to be rolled up into the internal space of the electronic device 2200. When the second housing 2220 moves in the first direction from the state of the at least a portion of the display 2230 being inserted into the internal space of the electronic device 2200, at least a portion of the display 2230 may slide out from the internal space of the electronic device 2200. In another example, when the second housing 2220 moves in the second direction, the at least a portion of the display 2230 may be rolled up into the inside of the electronic device 2200 to be slid-in into the internal space of the electronic device 2200. As the at least a portion of the display 2230 is pulled out or pulled in, the area of the display 2230 viewable from the outside of the electronic device 2200 may be expanded or reduced. The display 2230 may include a first area 2230a and a second area 2230b.

The first area 2230a of the display 2230 may refer to an area of the display 2230 that is viewable from the outside of the electronic device 2200, irrespective of whether the electronic device 2200 is either in the second state or the first state. For example, the first area 2230a may refer to a partial area of the display 2230 that is not rolled up into the internal space of the electronic device 2200. When the second housing 2220 moves, the first area 2230a may move together with the second housing 2220. For example, when the second housing 2220 moves either in the first direction or in the second direction, the first area 2230a may move in the first direction or the second direction, on the front surface of the electronic device 2200 together with the second housing 2220.

The second area 2230b of the display 2230 may be connected to the first area 2230a, and may be pulled in to the internal space or pulled out from the internal space of the electronic device 2200, according to the movement of the second housing 2220. For example, in the first state of the electronic device 2200, the second area 2230b of the display 2230 may be in a rolled state to be pulled-in into the internal space of the electronic device 2200. In the first state of the electronic device 2200, the second area 2230b of the display 2230 may not be viewable from the outside as it is inserted into the internal space of the electronic device 2200. In another example, in the second state of the electronic device 2200, the second area 2230b of the display 2230 may be in a state pulled-out from the internal space of the electronic device 2200. The second area 2230b of the display 2230 may be, in the second state, visible from the outside of the electronic device 2200.

In the first state of the electronic device 2200, the area of the display 2230 that is viewable from the outside of the electronic device 2200 may include only the first area 2230a of the display 2230. In the second state of the electronic device 2200, the area of the display 2230 that is viewable from the outside of the electronic device 2200 may include the first area 2230a and at least a portion of the second area 2230b of the display 2230.

The first housing 2210 of the electronic device 2200 may include a book cover 2211 surrounding the internal space of the first housing 2210 and a back plate 2212 covering a back surface of the book cover 2211. The second housing 2220 of the electronic device 2200 may include a front cover 2221 covering up the internal space of the electronic device 2200.

The front cover 2221 may include a first cover area 2221a of the front cover 2221 that is not inserted into the first housing 2210, and a second cover area 2221b that is inserted into the first housing 2210 or pulled-out therefrom. The first cover area 2221a of the front cover 2221 may always be visible from the outside, regardless of whether the electronic device 2200 is either in the second state or the first state. At least a portion of the first cover area 2221a of the front cover 2221 may form the side surface 2220a of the second housing 2220. According to an embodiment of the disclosure, the second cover area 2221b of the second housing 2220 is not visible from the outside in the first state, but may be visible in the second state.

The camera 2240 may acquire an image of a subject based on receiving light from the outside of the electronic device 2200. The camera 2240 may include one or more lenses, an image sensor, and/or an image signal processor. The camera 2240 may be arranged on the second housing 2220 to face the rear surface of the electronic device 2200 opposite to the front surface of the electronic device 2200 on which the first area 2230a of the display 2230 is disposed. For example, the camera 2240 may be arranged on the front cover 2221 of the second housing 2220, and in the first state of the electronic device 2200, may be viewable from the outside of the electronic device 2200, through an opening 2211a and formed in the book cover 2211. In another example, the camera 2240 may be arranged on the front cover 2221 of the second housing 2220, and may not be visible from the outside of the electronic device 2200, by being covered with the book cover 2211 and/or the rear plate 2212, when the electronic device 2200 is in the first state.

The camera 2240 may include a plurality of cameras. For example, the camera 2240 may include a wide-angle camera, an ultra-wide-angle camera, a telephoto camera, a close-up camera, and/or a depth camera. However, the camera 2240 is not necessarily limited to including a plurality of cameras, and may include only one camera.

The camera 2240 may further include a camera (not shown) arranged to face the front surface of the electronic device 2200 on which the first area 2230a of the display 2230 is disposed. When the camera 2240 is arranged to face the front surface of the electronic device 2200, the camera 2240 may be an under display camera (UDC) disposed below the display 2230 (e.g., in +z direction from the display 2230), but the disclosure is not limited thereto.

The electronic device 2200 may include a sensor module (not shown) and/or a camera module (not shown) disposed underneath the display 2230. The sensor module may detect an external environment based on information (e.g., light) received through the display 2230. The sensor module may include at least one of, for example, a receiver, a proximity sensor, an ultrasonic sensor, a gesture sensor, a gyro sensor, a barometric pressure sensor, a magnetic sensor, an acceleration sensor, a grip sensor, a color sensor, an IR (infrared) sensor, a biometric sensor, a temperature, a humidity sensor, a motor encoder, or an indicator. At least two sensor modules of the electronic device 2200 may be visually exposed to the outside through a partial area of the display 2230. The electronic device 2200 may detect a pull-out length (e.g., a pull-out length d1) using a sensor module. The electronic device 2200 may generate pull-out information on a degree of the pulling-out detected by the sensor. For example, the electronic device 2200 may detect and/or identify the degree of pulling-out of the second housing 2220, using the pull-out information. The pull-out information may include information on a pull-out length of the second housing 2220.

The shape of the coupling of the first housing 2210 and the second housing 2220 is not limited to the shape of coupling shown in FIGS. 22A, 22B, 22C, and 22D. The shape may be implemented with a combination and/or a coupling of other shapes or components.

FIG. 23A is an exploded perspective view of an electronic device according to an embodiment of the disclosure, and FIG. 23B is a cross-sectional view illustrating an example of an electronic device taken along a line A-A' of FIG. 22A, according to an embodiment of the disclosure.

Referring to FIGS. 23A and 23B, the electronic device 2200 may include the first housing 2210, the second housing 2220, the display 2230, the camera 2240, a battery 2250 and a driving unit 2260. The first housing 2210 and the second housing 2220 may be coupled to each other to form an internal space 2201 of the electronic device 2200. For example, in the first state of the electronic device 2200, the second area 2230b of the display 2230 may be accommodated in the internal space 2201.

The first housing 2210 may include the book cover 2211, the rear plate 2212, and a frame cover 2213. The book cover 2211, the rear plate 2212, and the frame cover 2213 included in the first housing 2210 may be coupled to each other, so that they do not move as the second housing 2220 moves relative to the first housing 2210. The book cover 2211 may form at least a portion of an outer surface of the electronic device 2200. For example, the book cover 2211 may form at least a portion of a side surface of the electronic device 2200 and form at least a portion of a rear surface of the electronic device 2200. The book cover 2211 may provide a surface on which the back plate 2212 is seated. The back plate 2212 may be seated on one surface of the book cover 2211.

The frame cover 2213 may be configured to support internal components of the electronic device 2200. For example, the frame cover 2213 may accommodate the battery 2250 and at least a portion of the driving unit 2260. The battery 2250 and the driving unit 2260 may be housed in at least one of a recess or a hole positioned in the frame cover 2213. The frame cover 2213 may be surrounded by the book cover 2211. For example, in the first state of the electronic device 2200, one surface 2213a of the frame cover 2213 on which the battery 2250 is disposed may face at least a portion of the book cover 2211 and/or the second surface 2230b of the display 2230. In another example, in the first state of the electronic device 2200, the other surface 2213b of the frame cover 2213 facing the one surface 2213a of the frame cover 2213 may be arranged to face the first area 2230a of the display 2230 or the front cover 2221. The frame cover 2213 may include an aluminum material, but the disclosure is not limited thereto.

The second housing 2220 may include the front cover 2221, the rear cover 2222, and a slide cover 2223. The front cover 2221, the rear cover 2222 and the slide cover 2223 may be coupled to each other, so that when the second housing 2220 moves relative to the first housing 2210, they may move together with the second housing 2220. The front cover 2221 may be configured to support internal components of the electronic device 2200. For example, a printed circuit board 2224 on which the electronic components (e.g., the processor 120 of FIG. 1) of the electronic device 2200 are disposed, and/or the camera 2240 may be arranged on one surface 2221c of the front cover 2221 facing the internal space 2201. The other surface 2221d of the front cover 2221 facing the one surface 2221c of the front cover 2221 may be configured to face the first area 2230a of the display 2230, when the electronic device 2200 is in the first state. The rear cover 2222 may be coupled to the front cover 2221 to protect components of the electronic device 2200 disposed on the front cover 2221. For example, the rear cover 2222 may cover a portion of one surface 2221c of the front cover 2221. The slide cover 2223 may be disposed on the rear cover 2222 (e.g., in +z direction) to form an external surface of the electronic device 2200 together with the rear plate 2212 and the book cover 2211. The slide cover 2223 may be coupled to one surface of the rear cover 2222 to protect the rear cover 2222 and/or the front cover 2221.

When the electronic device 2200 is in the first state, at least a part of the display 2230 may be rolled up into the internal space 2201, so that it may be bent therein. The display 2230 may cover at least a portion of the frame cover 2213 and at least a portion of the front cover 2221. For example, when the electronic device 2200 is in the first state, the display 2230 may cover the other surface 2221d of the front cover 2221 and pass between the front cover 2221 and the book cover 2211, extending toward the internal space 2201. After passing between the front cover 2221 and the book cover 2211, the display 2230 may surround the frame cover 2213. The display 2230 may cover one surface 2213a of the frame cover 2213 in the internal space 2201. When the second housing 2220 moves in the first direction, the second area 2230b of the display 2230 may be pulled out from the internal space 2201. For example, as the second housing 2220 moves in the second direction, the display 2230 may pass between the front cover 2221 and the book cover 2211 and may be then pulled out from the internal space 2201.

The electronic device 2200 may include a guide rail 2232 and a support bar 2231 supporting the display 2230. The support bar 2231 may include a plurality of bars coupled to each other and may be made in a shape corresponding to the shape of the second area 2230b of the display 2230. The support bar 2231 may move together with the display 2230 as the display 2230 moves. In the first state in which the second area 2230b of the display 2230 is rolled up in the internal space 2201, the support bar 2231 may be rolled up in the internal space 2201 together with the second area 2230b of the display 2230. The support bar 2231 may move together with the second area 2230b of the display 2230 as the second housing 2220 moves in the first direction. The guide rail 2232 may guide the movement of the support bar 2231. For example, as the display 2230 moves, the support bar 2231 may move along the guide rail 2232 coupled to the frame cover 2213. The guide rail 2232 may be coupled to the frame cover 2213. The guide rail 2232 may include a plurality of guide rails 2232 disposed to be spaced apart from each other at both edges of the frame cover 2213 spaced apart from each other in a third direction (e.g., +x direction) substantially perpendicular to the first direction (e.g., +y direction).

The driving unit 2260 may provide a driving force to the second housing 2220 so that the second housing 2220 can move relative to the first housing 2210. The driving unit 2260 may include a motor 2261, a pinion gear 2262 and a rack gear 2263. The motor 2261 may receive power from the battery 2250 to provide the driving force to the second housing 2220. The motor 2261 may be disposed in the first housing 2210 so that the motor 2261 does not move when the second housing 2220 moves with respect to the first housing 2210. For example, the motor 2261 may be disposed in a recess formed in the frame cover 2213. The pinion gear 2262 may be rotatably coupled to the motor 2261 and rotate by a driving force supplied from the motor 2261. According to one embodiment, the rack gear 2263 may be engaged with the pinion gear 2262, and may move according to the rotation of the pinion gear 2262. For example, the rack gear 2263 may linearly reciprocate in either the first direction or the second direction according to the rotation of the pinion gear 2262. According to an embodiment, the rack gear 2263 may be disposed in the second housing 2220. For example, the rack gear 2263 may be coupled to the front cover 2221 included in the second housing 2220. According to an embodiment, the rack gear 2263 may be movable in a working space 2213*p* formed in the frame cover 2213.

According to one embodiment, when the pinion gear 2262 rotates along the first rotational direction (e.g., clockwise in FIG. 23B), the rack gear 2263 may move in the first direction (e.g., +y direction). When the rack gear 2263 moves in the first direction, the second housing 2220 coupled to the rack gear 2263 may also move in the first direction. As the second housing 2220 moves in the first direction, the area of the display 2230 viewable from the outside of the electronic device 2200 may be expanded. When the pinion gear 2262 rotates in the second rotational direction (e.g., counterclockwise in FIG. 23B), the rack gear 2263 may also move in the second direction (e.g., −y direction). When the rack gear 2263 moves in the second direction, the second housing 2220 coupled to the rack gear 2263 may also move in the second direction. As the second housing 2220 moves in the second direction, the area of the display 2230 viewable from the outside of the electronic device 2200 may be reduced.

Although the foregoing description was made of the arrangement that the motor 2261 and the pinion gear 2262 are disposed in the first housing 2210, and the rack gear 2263 is disposed in the second housing 2220, the embodiments of the disclosure may not be limited thereto. According to another embodiment of the disclosure, the motor 2261 and the pinion gear 2262 may be disposed in the second housing 2220, and the rack gear 2263 may be disposed in the first housing 2210.

An electronic device, a method, and a non-transitory computer-readable storage medium according to an embodiment can display a visual object for changing a size of a display region of a flexible display, thereby providing its user with enhanced user experience (UX).

According to an embodiment of the disclosure, an electronic device may include a housing, a flexible display that is slidable into the housing or slidable out from the housing, an actuator for pulling in at least a portion of the flexible display into the housing or pulling out at least a portion of the flexible display from the housing, a memory configured to store instructions, and a processor operatively coupled to the flexible display. The processor may be configured to, when the instructions are executed, receive a user input for changing an execution state of a software application. The processor may be configured to, when the instructions are executed, identify whether a state of a display region of the flexible display exposed out of the housing is a reference state, in response to the user input. The processor may be configured to, when the instructions are executed, display a visual object for guiding to change the state of the display region to the reference state, based on identifying that the state of the display region is distinguished from the reference state. The processor may be configured to, when the instructions are executed, change a size of the display region from a first size to a second size corresponding to the reference state via the actuator, based at least in part on the user input received while the visual object is displayed. The processor may be configured to, when the instructions are executed, display a user interface of the software application in the display region having the second size.

The processor may be further configured to, when the instructions are executed, refrain from displaying the visual object, based on identifying that the state of the display region corresponds to the reference state.

The user input for changing the execution state of the software application may include a user input for displaying a screen including a list of software applications being executed in the electronic device. The visual object may be displayed in the screen.

The processor may be configured to, when the instructions are executed, display an image, included in the screen, corresponding to the user interface in the display region having the first size, based on identifying that the state of the display region corresponds to the reference state. The processor may be further configured to, when the instructions are executed, display the image associated with the visual object in the display region having the first size, based on identifying that the state of the display region is distinguished from the reference state. The visual object may have a representation for indicating the second size.

The processor may be configured to, when the instructions are executed, receive a user input for the image while the image associated with the visual object is displayed in the screen. The processor may be configured to, when the instructions are executed, display information for identifying whether to change the size of the display region to the second size, in response to the user input for the image. The processor may be configured to, when the instructions are executed, in response to a user input received while the information is displayed, change the size of the display region to the second size, and display the user interface in the display region having the second size. The processor may be configured to, when the instructions are executed, in response to another user input received while the information is displayed, maintain the size of the display region at the first size, and display the user interface in the display region having the first size.

The processor may be configured to, when the instructions are executed, receive a user input for the image while the image associated with the visual object is displayed in the screen. The processor may be configured to, when the instructions are executed, display the user interface in the display region having the first size, together with another visual object including a reduced image of the user interface in the display region having the second size, in response to the user input for the image. The processor may be configured to, when the instructions are executed, in response to a user input for the other visual object, change the size of the display region to the second size, and display the user interface in the display region having the second size.

The other visual object may be superimposed or floated on the user interface.

The processor may be configured to receive, when the instructions are executed, a user input for the image, while the image associated with the visual object is displayed in the screen. The processor may be configured to, when the instructions are executed, in response to the user input for the image, display the user interface in the display region having the first size, together with another visual object to change the state of the display region to the reference state. The processor may be configured to, when the instructions are executed, in response to a user input for the other visual object, change the size of the display region to the second size, and display the user interface in the display region having the second size. The other visual object may be displayed within a navigation bar displayed in the display region.

The processor may be configured to, when the instructions are executed, in response to receiving a user input for the visual object while the image associated with the visual object is displayed in the screen, change the size of the display region to the second size, and display the user interface in the display region having the second size. The processor may be configured to, when the instructions are executed, in response to receiving a user input for the image while the image associated with the visual object is displayed in the screen, display the user interface in the display region having the first size.

The user input for changing the execution state of the software application may include a user input for executing the software application. The processor may be configured to, when the instructions are executed, based on identifying that the state of the display region is distinguished from the reference state, display the visual object in the display region having the first size, together with the user interface displayed in response to execution of the software application. The processor may be configured to, when the instructions are executed, refrain from displaying the visual object, based on identifying that the state of the display region corresponds to the reference state.

The visual object may be displayed at a position where the user input for executing the software application is received.

The visual object may be superimposed or floated on the user interface.

The processor may be configured to, when the instructions are executed, identify whether a predetermined time elapses from a timing point of displaying the visual object. The processor may be configured to, when the instructions are executed, maintain displaying the visual object with the user interface while identifying that the predetermined time has not elapsed from the timing point. The processor may be further configured to, when the instructions are executed, cease displaying the visual object in response to identifying that the predetermined time has elapsed from the timing point.

The reference state may be a state of the display region when the user interface is displayed before receiving the user input for changing the execution state of the software application.

The reference state may be a state of the display region identified based on an arrangement of content in the user interface.

The reference state may be a state of the display region identified based on attributes of at least some of the content in the user interface.

The reference state may be a state of the display region identified based on a size of content in the user interface.

The visual object may include a visual element for indicating the second size.

The visual element may include a bar-shaped indicator for showing a length corresponding to the second size.

The processor may be further configured to, when the instructions are executed, change the size of the display region to the second size, in response to a touch input on the visual object that is released before a predetermined time elapses. The processor may be further configured to, when the instructions are executed, display the visual object including the bar-shaped indicator having an enlarged size, in response to a touch input on the visual object that is maintained for the predetermined time or longer. The processor may be further configured to, when the instructions are executed, change the size of the display region to a size corresponding to a user input received through the bar-shaped indicator having the enlarged size, via the actuator.

According to an embodiment of the disclosure, an electronic device may include a housing, a flexible display that is slidable into or slidable out of the housing, an actuator for pulling-in at least a portion of the flexible display into the housing or pulling-out at least a portion of the flexible display from the housing, a memory configured to store instructions, and a processor operatively coupled to the flexible display. The processor may be configured to, when the instructions are executed, identify that, while a user interface of a software application is displayed, a content in the user interface is intersected with an edge of a display region of the flexible display exposed out of the housing. The processor may be configured to, when the instructions are executed, display a visual object for guiding to change a state of the display region around the content, based on the identifying. The processor may be configured to, when the instructions are executed, extend the display region via the actuator to resume displaying of a portion of the content that was interrupted according to the intersection with the periphery, in response to a user input on the visual object.

An electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment of the disclosure. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1540) including one or more instructions that are stored in a storage medium (e.g., an internal memory 1536 or an external memory 1538)

that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a first housing part and a second housing part configured to movably engage with the first housing part between a retracted position and an extended position;
a flexible display coupled to the first housing part and the second housing part such that a size of a display region of the flexible display that is visible from a front side of the housing changes as the housing is moved between the retracted position and the extended position;
an actuator;
at least one processor comprising processing circuitry; and
memory comprising one or more storage media storing instructions that, when executed by the at least one processor individually or collectively, cause the electronic device to:
receive a user input for selecting a software application,
based on the user input, identify a reference size of a user interface of the software application in accordance with an execution history of the software application,
compare a size of the user interface to be displayed in the display region having a first size, with the reference size,
based on the size of the user interface being different from the reference size, display a visual object for guiding to change the size of the display region in which the user interface is to be displayed,
based on at least one user input received with respect to the visual object, control the actuator to change the size of the display region from the first size to a second size corresponding to the reference size, and
display the user interface of the software application in the display region having the second size.

2. The electronic device of claim 1, wherein the instructions, when executed by the at least one processor individually or collectively, cause the electronic device to:
refrain from displaying the visual object, based on the size of the user interface corresponding to the reference size.

3. The electronic device of claim 1,
wherein the user input for selecting the software application includes a user input for displaying a screen including a list of software applications being executed in the electronic device,
wherein the list of software applications, included in the screen, includes an image of the user interface, and
wherein the visual object is displayed in the screen.

4. The electronic device of claim 3,
wherein the instructions, when executed by the at least one processor individually or collectively, cause the electronic device to:
in response to the user input, display the image of the user interface, included in the screen, in the display region having the first size, based on the size of the user interface corresponding to the reference size, and
in response to the user input, display the image associated with the visual object in the display region having the first size, based on the size of the user interface being different from the reference size, and
wherein the visual object has a representation for indicating the second size.

5. The electronic device of claim 4, wherein the instructions, when executed by the at least one processor individually or collectively, cause the electronic device to:
receive a user input for the image while the image associated with the visual object is displayed in the screen,
in response to the user input for the image, display information for identifying whether to change the size of the display region to the second size, in response to a first user input received with respect to the displayed information, change the size of the display region to the second size, and display the user interface in the display region having the second size, and in response to a second user input received with respect to the displayed information, maintain the size of the display region at the first size, and display the user interface in the display region having the first size.

6. The electronic device of claim 4, wherein the instructions, when executed by the at least one processor individually or collectively, cause the electronic device to:

receive a user input for the image while the image associated with the visual object is displayed in the screen, in response to the user input for the image, display the user interface in the display region having the first size, together with another visual object including a reduced image of the user interface to be displayed in the display region having the second size, and in response to a user input for the other visual object, change the size of the display region to the second size, and display the user interface in the display region having the second size.

7. The electronic device of claim 6, wherein the other visual object is superimposed or floated on the user interface.

8. The electronic device of claim 4, wherein the instructions, when executed by the at least one processor individually or collectively, cause the electronic device to:

receive a user input for the image, while the image associated with the visual object is displayed in the screen, in response to the user input for the image, display the user interface in the display region having the first size, together with another visual object to change the size of the display region to the second size, and in response to a user input for the other visual object, change the size of the display region to the second size, and display the user interface in the display region having the second size, and wherein the other visual object is displayed within a navigation bar displayed in the display region.

9. The electronic device of claim 4, wherein the instructions, when executed by the at least one processor individually or collectively, cause the electronic device to:

in response to receiving a user input for the visual object while the image associated with the visual object is displayed in the screen, change the size of the display region to the second size, and display the user interface in the display region having the second size, and in response to receiving a user input for the image while the image associated with the visual object is displayed in the screen, display the user interface in the display region having the first size.

10. The electronic device of claim 1, wherein the user input for selecting the software application includes a user input for executing the software application, and wherein the instructions, when executed by the at least one processor individually or collectively, cause the electronic device to:

based on the size of the user interface being different from the reference size, display the visual object in the display region having the first size, together with the user interface displayed in response to execution of the software application, and based on the size of the user interface corresponding to the reference size, refrain from displaying the visual object.

11. The electronic device of claim 10, wherein the visual object is displayed at a position where the user input for executing the software application is received.

12. The electronic device of claim 11, wherein the visual object is superimposed or floated on the user interface.

13. The electronic device of claim 10, wherein the instructions, when executed by the at least one processor individually or collectively, cause the electronic device to:

identify whether a predetermined time elapses from a timing point of displaying the visual object, maintain displaying the visual object with the user interface, while identifying that the predetermined time has not elapsed from the timing point, and cease displaying the visual object in response to identifying that the predetermined time has elapsed from the timing point.

14. The electronic device of claim 1, wherein the reference size, identified in accordance with the execution history of the software application, is a size of the user interface that was displayed before receiving the user input.

15. The electronic device of claim 1, wherein the reference size is identified further based on an arrangement of content in the user interface.

16. The electronic device of claim 1, wherein the reference size is identified further based on attributes of content in the user interface.

17. The electronic device of claim 1, wherein the reference size is identified further based on a size of content in the user interface.

18. The electronic device of claim 1, wherein the visual object includes a visual element for indicating the second size.

19. The electronic device of claim 18, wherein the visual element includes a bar-shaped indicator for showing a length corresponding to the second size.

20. The electronic device of claim 19, wherein the instructions, when executed by the at least one processor individually or collectively, cause the electronic device to:

in response to a touch input on the visual object that is released before a predetermined time elapses, change the size of the display region to the second size, in response to a touch input on the visual object that is maintained for the predetermined time or longer, display the visual object including the bar-shaped indicator having an enlarged size, and change the size of the display region to a size corresponding to a user input received through the bar-shaped indicator having the enlarged size, via the actuator.

* * * * *